United States Patent
Batra et al.

(10) Patent No.: US 10,878,604 B2
(45) Date of Patent: Dec. 29, 2020

(54) GENERATING A TRIANGLE MESH FOR AN IMAGE REPRESENTED BY CURVES

(71) Applicant: Adobe Inc., San Jose, CA (US)

(72) Inventors: Vineet Batra, Pitam Pura (IN); Matthew David Fisher, Palo Alto, CA (US); Kevin John Wampler, Seattle, WA (US); Daniel M. Kaufman, Seattle, WA (US); Ankit Phogat, Noida (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/427,005

(22) Filed: May 30, 2019

(65) Prior Publication Data

US 2019/0279406 A1    Sep. 12, 2019

Related U.S. Application Data

(63) Continuation of application No. 15/861,908, filed on Jan. 4, 2018, now Pat. No. 10,388,045.

(51) Int. Cl.
    *G06T 11/40* (2006.01)
    *G06T 11/60* (2006.01)
    *G06T 11/20* (2006.01)

(52) U.S. Cl.
    CPC .......... *G06T 11/40* (2013.01); *G06T 11/203* (2013.01); *G06T 11/60* (2013.01)

(58) Field of Classification Search
    CPC ........ G06T 11/00; G06T 11/203; G06T 11/40; G06T 11/60; G06T 11/80
    See application file for complete search history.

(56) References Cited

U.S. PATENT DOCUMENTS

| 5,611,036 A | 3/1997 | Berend et al. |
| 5,861,889 A | 1/1999 | Wallace et al. |

(Continued)

FOREIGN PATENT DOCUMENTS

EP    2530623    12/2012

OTHER PUBLICATIONS

Huynh, Lisa, and Yotam Gingold. "Bijective deformations in Rn via integral curve coordinates." CoRR abs/1505.00073 (Year: 2015).*

(Continued)

*Primary Examiner* — Diane M Wills
(74) *Attorney, Agent, or Firm* — SBMC

(57) ABSTRACT

Systems and techniques are described herein for generating a triangle mesh for an image represented by curves (e.g., Bezier segments). An outline of an image is determined and reduced to a set of connected polylines that are efficiently represented in an edge list. A triangle mesh is generated based on the edge list, rather than by directly sampling the curves of the image and using the samples as vertices of triangles. Thus, the triangle mesh is generated with a number of triangles independent from a number of curves representing the image. Samples of the curves are bound to the triangle mesh by representing the samples with barycentric coordinates with respect to a triangle in the mesh. Hence, once a mesh is deformed, locations of the samples are determined from the barycentric coordinates and triangles in the deformed mesh, and used to reconstruct the curves of the deformed image.

20 Claims, 13 Drawing Sheets

(56) References Cited

U.S. PATENT DOCUMENTS

| | | | |
|---|---|---|---|
| 5,894,310 A | 4/1999 | Arsenault et al. | |
| 6,154,221 A | 11/2000 | Gangnet | |
| 6,268,871 B1 | 7/2001 | Rice et al. | |
| 6,441,823 B1 | 8/2002 | Ananya | |
| 6,448,964 B1 | 9/2002 | Isaacs et al. | |
| 6,781,597 B1 | 8/2004 | Vrobel et al. | |
| 6,919,888 B1 | 7/2005 | Perani et al. | |
| 7,196,707 B2 | 3/2007 | Davignon | |
| 7,218,326 B1 | 5/2007 | Bogues et al. | |
| 7,302,650 B1 | 11/2007 | Allyn et al. | |
| 7,496,416 B2 | 2/2009 | Ferguson et al. | |
| 7,868,887 B1* | 1/2011 | Yhann | G06T 11/203 345/442 |
| 7,884,834 B2 | 2/2011 | Mouilleseaux et al. | |
| 8,004,539 B2 | 8/2011 | McDaniel et al. | |
| 8,373,704 B1 | 2/2013 | Mueller | |
| 8,629,871 B2 | 1/2014 | O'Brien et al. | |
| 8,830,226 B2 | 9/2014 | Goossens | |
| 8,994,736 B2 | 3/2015 | Carr et al. | |
| 9,024,938 B2 | 5/2015 | Joshi | |
| 9,454,797 B2 | 9/2016 | Popovic et al. | |
| 10,388,045 B2 | 8/2019 | Batra et al. | |
| 10,410,317 B1 | 9/2019 | Phogat et al. | |
| 10,510,186 B2 | 12/2019 | Batra et al. | |
| 10,832,446 B2 | 11/2020 | Phogat et al. | |
| 2003/0033050 A1 | 2/2003 | Yutkowitz | |
| 2005/0237325 A1 | 10/2005 | Motter et al. | |
| 2007/0038421 A1 | 2/2007 | Hu et al. | |
| 2009/0213143 A1* | 8/2009 | Igarashi | G06T 3/0093 345/643 |
| 2010/0189362 A1 | 7/2010 | Jakubiak et al. | |
| 2010/0214312 A1 | 8/2010 | Weber et al. | |
| 2012/0154397 A1 | 6/2012 | Chernikov et al. | |
| 2013/0120457 A1* | 5/2013 | Popovic | G06T 3/0093 345/647 |
| 2013/0300736 A1 | 11/2013 | Schmidt | |
| 2014/0104266 A1 | 4/2014 | Stone et al. | |
| 2014/0168270 A1 | 6/2014 | Choy et al. | |
| 2015/0022517 A1 | 1/2015 | Jutan et al. | |
| 2015/0287210 A1* | 10/2015 | Song | G06T 7/0012 382/173 |
| 2018/0040169 A1 | 2/2018 | Nakagawa | |
| 2018/0061092 A1 | 3/2018 | Sasikumar et al. | |
| 2018/0061093 A1 | 3/2018 | Liu | |
| 2019/0197771 A1 | 6/2019 | Batra et al. | |
| 2019/0206100 A1 | 7/2019 | Batra et al. | |
| 2019/0295217 A1 | 9/2019 | Phogat et al. | |
| 2019/0318523 A1 | 10/2019 | Higginbottom | |
| 2020/0066038 A1 | 2/2020 | Batra et al. | |
| 2020/0219287 A1 | 7/2020 | Phogat et al. | |
| 2020/0334874 A1 | 10/2020 | Phogat et al. | |

OTHER PUBLICATIONS

Karni et al., "Spectral Compression of Mesh Geometry", Computer Science Department, Technion—Israel Institute of Technology (Year: 2000).*

Meng et al, "Interactive Image Deformation Using Cage Coordinates on GPU", Association for Computing Machinery (Year: 2009).*

Sorkine et al., "Laplacian Surface Editing", School of Computer Science, Tel Aviv University (Year: 2004).*

"Notice of Allowance", U.S. Appl. No. 15/852,924, dated Aug. 2, 2019, 8 pages.

"Adobe Illustrator CC Tutorials", Retrieved at: https://helpx.adobe.com/in/illustrator/how-to/dynamic-symbols.html—on Jan. 8, 2019, 8 pages.

"Barycentric coordinate system—Wikipedia", https://en.wikipedia.org/wiki/Barycentric_coordinate_system—Retrieved on Oct. 11, 2017, 9 pages.

"Bounding volume hierarchy—Wikipedia", https://en.wikipedia.org/wiki/Bounding_volume_hierarchy—Retrieved on Oct. 11, 2017, 3 pages.

"Combined Search and Examination Report", GB Application No. 1816796.5, dated Apr. 17, 2019, 5 pages.

"Final Office Action", U.S. Appl. No. 15/852,924, dated Apr. 30, 2019, 17 pages.

"First Action Interview Office Action", U.S. Appl. No. 15/852,924, dated Oct. 11, 2018, 5 pages.

"First Action Interview Office Action", U.S. Appl. No. 15/936,299, dated Jan. 18, 2019, 4 pages.

"Kabsch algorithm—Wikipedia", Retrieved at: https://en.wikipedia.org/wiki/Kabsch_algorithm—Sep. 27, 2017, 4 pages.

"Notice of Allowance", U.S. Appl. No. 15/861,908, dated Apr. 3, 2019, 14 pages.

"Notice of Allowance", U.S. Appl. No. 15/936,299, dated May 3, 2019, 9 pages.

"Pre-Interview First Office Action", U.S. Appl. No. 15/852,924, dated Jul. 27, 2018, 4 pages.

"Pre-Interview First Office Action", U.S. Appl. No. 15/861,908, dated Jan. 18, 2019, 22 pages.

"Pre-Interview First Office Action", U.S. Appl. No. 15/936,299, dated Sep. 21, 2018, 4 pages.

"Ramer-Douglas-Peucker algorithm—Wikipedia", https://en.wikipedia.org/wiki/Ramer%E2%80%93Douglas%E2%80%93Peucker_algorithm—Retrieved on Oct. 11, 2017, 4 pages.

Au,"Skeleton Extraction by Mesh Contraction", ACM Trans. Graph., 27(3):44:1{44:10,, Aug. 2008, 10 pages.

Batra,"Digital Media Environment for Intuitive Modifications of Digital Graphics", U.S. Appl. No. 15/852,924, filed Dec. 22, 2017, 60 pages.

Batra,"Generating A Triangle Mesh for an Image Represented by Curves", U.S. Appl. No. 15/861,908, filed Jan. 4, 2018, 80 pages.

Batra,"Generating a Triangle Mesh for an Image Represented by Curves", U.S. Appl. No. 15/861,908, filed Jan. 4, 2018, 93 pages.

Boye,"A Vectorial Solver for Free-form Vector Gradient", ACM Trans. Graph. 31, 6, Article 173, Sep. 17, 2012, 10 pages.

De"Vector Field Processing on Triangle Meshes", In SIGGRAPH Asia 2015 Courses (SA '15), Nov. 2, 2015, 49 pages.

Igarashi,"As-Rigid-As-Possible Shape Manipulation", ACM Transactions on Graphics 2005, Aug. 2005, 1134-1141.

Jacobson,"Bounded Biharmonic Weights for Real-Time Deformation", In ACM SIGGRAPH 2011 Papers, SIGGRAPH '11, Jul. 2011, 8 pages.

Jacobson,"Fast Automatic Skinning Transformations", ACM Trans. Graph. 31,, Jul. 2012, 10 pages.

Komerska,"Haptic Gdraw: A fun and Easy to Use 3D Haptically Enhanced Sculpting Program", EuroHaptics 2004, Jun. 2004, 6 pages.

Liu,"Skinning Cubic B'ezier Splines and Catmull-Clark Subdivision Surfaces", ACM Trans. Graph. 33, 6, Article 190, Nov. 19, 2014, 9 pages.

Liu,"Skinning Cubic B'ezier Splines and Catmull-Clark Subdivision Surfaces", ACM Trans. Graph., 33(6):190:1{190:9, Nov. 19, 2014, 9 pages.

Martins,"Bezier Curve Quick Tips: Two Methods for Smooth Curves", Posted Sep. 16, 2014; https://learn.scannerlicker.net/2014/09/16/bezier-curve-quick-tips-two-methods-for-smooth-curves/, Sep. 16, 2014, 11 pages.

Phogat,"Bone Handle Generation", U.S. Appl. No. 16/241,719, filed Jan. 7, 2018, 42 pages.

Phogat,"Digital Image Transformation Environment using Spline Handles", U.S. Appl. No. 15/936,299, filed Mar. 26, 2018, 42 pages.*

Schaefer,"Image Deformation Using Moving Least Squares", SIGGRAPH, 25(3), Aug. 2006, 8 pages.

Schneider,"An Algorithm for Automatically Fitting Digitized Curves", Academic Press Professional, Inc., San Diego, CA, USA, 1990., Aug. 1, 1990, pp. 612-626.

Shewchuk,"Triangle: Engineering a 2D Quality Mesh Generator and Delaunay Triangulator", Applied Computational Geometry: Towards Geometric Engineering, Lin M.C., Manocha D., (Eds.), vol. 1148 of Lecture Notes in Computer Science. Springer-Verlag, May 1996, pp. 203-222. From the First ACM Workshop on Applied Computational Geometry., May 1996, 10 pages.

Visvalingam,"The Douglas-Peuker Algorithm for Line Simplification: Re-evaluation through Visualization", Sep. 1990, pp. 213-228.

(56) References Cited

OTHER PUBLICATIONS

Weng,"Sketching MLS Image Deformations on the GPU", Pacific Graphics 2008, vol. 27, Oct. 2008, 1789-1796.
"First Action Interview Office Action", U.S. Appl. No. 16/241,719, dated Mar. 17, 2020, 4 pages.
"Pre-Interview First Office Action", U.S. Appl. No. 16/241,719, dated Feb. 5, 2020, 39 pages.
"Pre-Interview First Office Action", U.S. Appl. No. 16/674,931, dated Feb. 20, 2020, 3 pages.
Cohen-Steiner,"Conforming Delaunay Triangulation in 3D", Jun. 2004, pp. 217-233.
"Notice of Allowance", U.S. Appl. No. 16/241,719, dated Jun. 22, 2020, 11 pages.
"Supplemental Notice of Allowability", U.S. Appl. No. 16/241,719, dated Jun. 26, 2020, 2 pages.
"First Action Interview Office Action", U.S. Appl. No. 16/674,931, dated Apr. 10, 2020, 3 pages.
"Corrected Notice of Allowability", U.S. Appl. No. 16/387,186, dated Oct. 30, 2020, 12 pages.
"Notice of Allowance", U.S. Appl. No. 16/387,186, Oct. 20, 2020, 13 pages.
"Corrected Notice of Allowability", U.S. Appl. No. 16/241,719, dated Sep. 29, 2020, 2 pages.
"Final Office Action", U.S. Appl. No. 16/674,931, dated Sep. 1, 2020, 13 pages.
"First Action Interview Office Action", U.S. Appl. No. 16/387,186, dated Sep. 11, 2020, 3 pages.
"Pre-Interview First Office Action", U.S. Appl. No. 16/387,186, dated Jul. 13, 2020, 8 pages.

\* cited by examiner

GENERATING A TRIANGLE MESH FOR AN IMAGE REPRESENTED BY CURVES

CLAIM OF PRIORITY

This application is a continuation of and claims priority to U.S. patent application Ser. No. 15/861,908, filed Jan. 4, 2018, entitled "Generating A Triangle Mesh For An Image Represented By Curves", the entire disclosure of which is hereby incorporated by reference herein in its entirety.

BACKGROUND

Images are often represented by vector graphics including curves, such as splines (e.g., piecewise polynomials), since such a representation is independent of resolution and therefore image quality can be maintained across multiple resolution formats. Editing images represented by curves, such as in a workflow to create an animation sequence from the image, traditionally involves editing the curves based on basis points. These editing techniques are extremely time consuming, and require a high level of expertise on behalf of the graphic designer.

Consequently, editing techniques (e g, animation workflows) have been recently developed that do not operate directly on the curve representation of an image, but instead operate on a geometry of an interior of the image created from small primitives, such as a mesh of triangles (e.g., a triangle mesh). For instance, an animation sequence can be generated by iteratively deforming the triangle mesh to generate different images in the animation sequence. Accordingly, techniques are needed to generate such a geometry (e.g., a triangle mesh) for an image represented by curves.

One method of generating a triangle mesh for an image represented by curves is to populate the convex hull of a tightest polygon that encloses the image (e.g., all the curves of the image lie within the polygon) with a triangle mesh. As an example, FIG. 1 illustrates an example image 100 in accordance with one or more aspects of the disclosure. Example image 100 includes artwork 102 (e.g., a crocodile) and mesh 104. Mesh 104 is generated from the convex hull of a tightest polygon that encloses artwork 102 (e.g., the crocodile). Accordingly, mesh 104 overlaps not only the crocodile, but also regions not represented by the crocodile, such as region 106 under the crocodile's belly and between the crocodile's head and tail, generally denoted in FIG. 1 with a dashed circle. For instance, region 106 includes mesh 104, but does not include artwork 102. As a result, mesh 104 connects components of the crocodile that were not originally connected in artwork 102. Consequently, when mesh 106 is deformed, such as by selecting and dragging one of handles 108, the crocodile may be deformed in an undesired way. For instance, moving the crocodile's tail will also move the crocodile's head, moving one of the crocodile's legs will also move another of the crocodile's legs, and the like. Therefore, methods that generate a triangle mesh for an image from the convex hull of a tightest polygon that encloses the image do not produce acceptable triangle meshes for most graphics workflows, such as generating animation sequences.

Another method of generating a triangle mesh for an image represented by curves is to sample the curves of the image and use the sample points as vertices of triangles in a triangle mesh. Though such a method generally overcomes the shortcomings of the convex-hull approach discussed above, the density of the triangle mesh generated from samples of curves is not decoupled from the density of the curves. Thus, the triangle mesh can contain a prohibitively large number of triangles (e g, millions of triangles for reasonable samplings of curves of realistic images), which require prohibitively large numbers of calculations and computing resources in most graphics workflows. Moreover, for complex curve representations, methods that sample the curves and use the samples as vertices of triangles can lack robustness and fail to generate a triangle mesh in regions of high complexity of the curves.

Furthermore, both methods (i) that generate a triangle mesh for an image from the convex hull of a tightest polygon that encloses the image, and (ii) that sample the curves and use the samples as vertices of triangles, do not generate a mesh for regions of an image obscured by a clipping path. For instance, when an image is inserted into a bounding shape, such as box, circle, star, and the like, a region of the image can be masked by the bounding shape, creating a clipping path. Both methods (i) and (ii) do not generate a mesh for regions outside the clipping path and account for these regions when the mesh is deformed, and therefore may provide unsatisfactory results for graphics workflows that incorporate clipping paths.

SUMMARY

Techniques and systems are described to generate a triangle mesh for an image represented by curves that decouple the density of the triangle mesh from the density of the curves of the image. An image is rasterized and an outline of the image is generated. The outline is reduced to a set of connected polylines that are efficiently represented in an edge list. A triangle mesh is generated for the image based on the polylines indicated in the edge list. Hence, the number of triangles in the triangle mesh is independent from the number of curves representing the image, since the triangle mesh is generated from polylines representing an outline of the image. Samples of the curves are bound to the mesh by representing the samples with barycentric coordinates with respect to a triangle in the mesh, including samples of curves covered by the mesh and samples of curves obscured by a clipping path that are not covered by the mesh. The triangle mesh supports graphics workflows that operate on the mesh, rather than the curves, including deforming the mesh to produce a deformed mesh and reconstructing the curves from the deformed mesh using the barycentric coordinates of the samples.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
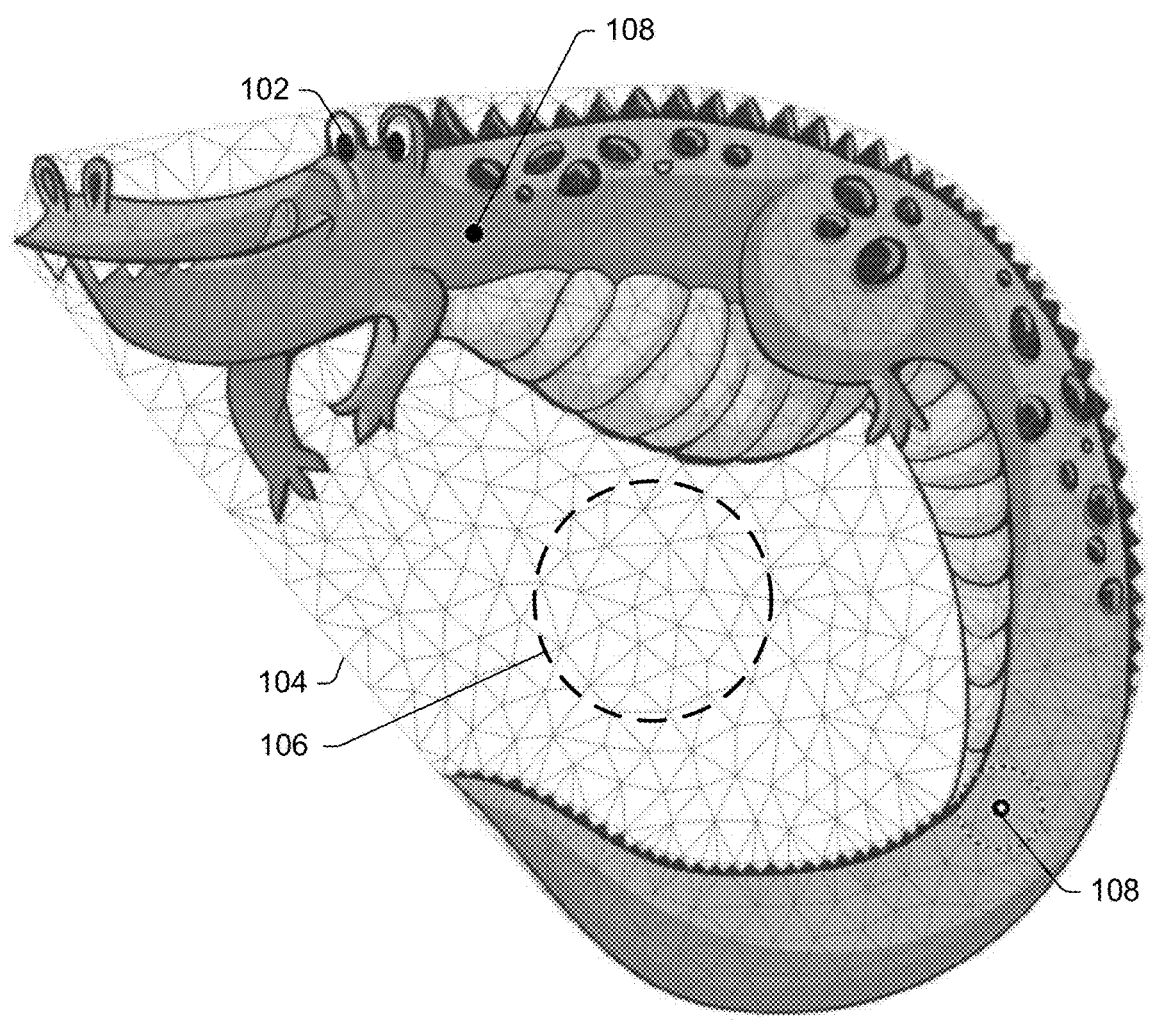
FIG. 1 illustrates an example image in accordance with one or more aspects of the disclosure.

Modern graphics workflows operate on a geometry of an interior of an image created from small primitives, such as a mesh of triangles (e.g., a triangle mesh), rather than operating directly on curves representing the image, such as vector graphics including splines, polynomial splines, Bezier segments, and the like. Triangle meshes generated by most techniques do not accurately connect components of the image (e.g., the crocodile's tail is connected to the crocodile's head by mesh 104 in FIG. 1, as discussed above), often include prohibitively large numbers of triangles because the triangle mesh is not decoupled from the curves of the image, and do not account for regions of the image masked by clipping paths.

Accordingly, this disclosure describes systems and techniques for generating a triangle mesh for an image represented by curves that decouple the density of the triangle mesh from the density of the curves of the image. An image is rasterized, and an outline of the image is generated. The outline can be inflated, such as by a number of pixels (e.g., 3 pixels), to connect disjoint outlines resulting from disjoint portions of the image. The outline is reduced to a set of connected polylines. The polylines simplify the outline into a set of piecewise linear segments connected at their endpoints, and can be efficiently represented in an edge list indicating segment vertices (e.g., endpoint positions) and their connections. The polylines can be automatically inflated (e.g., without user intervention) when a singularity condition is detected, such as when two or more polylines are self-overlapping polylines (e.g., collinear and overlapping).

A triangle mesh is generated from the edge list for the interior region of the connected polylines. Hence, the number of triangles in the triangle mesh is independent from the number of curves representing the image, since the triangle mesh is generated from polylines representing an outline of the image. The triangle mesh can be generated subject to any suitable constraint, such as constraining triangles of the mesh to have at least a minimum angle (e.g., 20 degrees) and to include no more than a maximum number of pixels of the rasterized image (e.g., 256 pixels). A triangle mesh can be generated for one or more objects in an image, and be designated by a user to be maintained as a separate triangle mesh (e.g., so it is not merged with another triangle mesh of another object in the image). Additionally or alternatively, two or more triangle meshes can be joined by inflating one or more triangle meshes, thus connecting two or more objects in an image so that their movements are coupled.

Samples of the curves are determined by sampling the curves. The number of samples per curve can be based on the length of the curve (or length of a segment of the curve). Samples of the curves are bound to the triangle mesh by representing the samples with coordinates (e.g., barycentric coordinates) with respect to a triangle in the mesh. Barycentric coordinates correspond to a unique combination of vertices of a triangle used to represent a point within the triangle. When a clipping path exists that masks a region of the image so that a triangle mesh does not cover the region, samples of curves within the region are bound to a respective nearest triangle in the mesh by computing barycentric coordinates of the samples with respect to the respective nearest triangle. Accordingly, the region of the image outside the clipping path can be deformed by the triangle mesh, despite the region not being overlapped by the triangle mesh. To speed the binding process and efficiently determine a respective nearest triangle, a bounding volume hierarchy structure is used. Rectangles are determined as bounding volumes for triangles in the triangle mesh, and the rectangles of the bounding volume hierarchy structure are searched to determine a respective triangle in the mesh.

The triangle mesh supports graphics workflows that operate on the triangle mesh, including deforming the mesh to produce a deformed mesh and reconstructing the curves from the deformed mesh. For instance, locations of triangles in the deformed mesh are obtained, and together with the barycentric coordinates of the samples, provide sufficient information to calculate new positions of the samples after the deformation. Curves are reconstructed based on the new position of the samples. Hence, a reconstructed image can be further processed by a graphics workflow that not only operates on the triangle mesh, but also a graphics workflow that operates on the curves themselves, such as by editing basis points of the curves.

In the following discussion an example digital medium environment is described that may employ the techniques described herein. Example implementation details and procedures are then described which may be performed in the example digital medium environment as well as other environments. Consequently, performance of the example procedures is not limited to the example environment and the example environment is not limited to performance of the example procedures.

Example Digital Medium Environment

Figure 2:
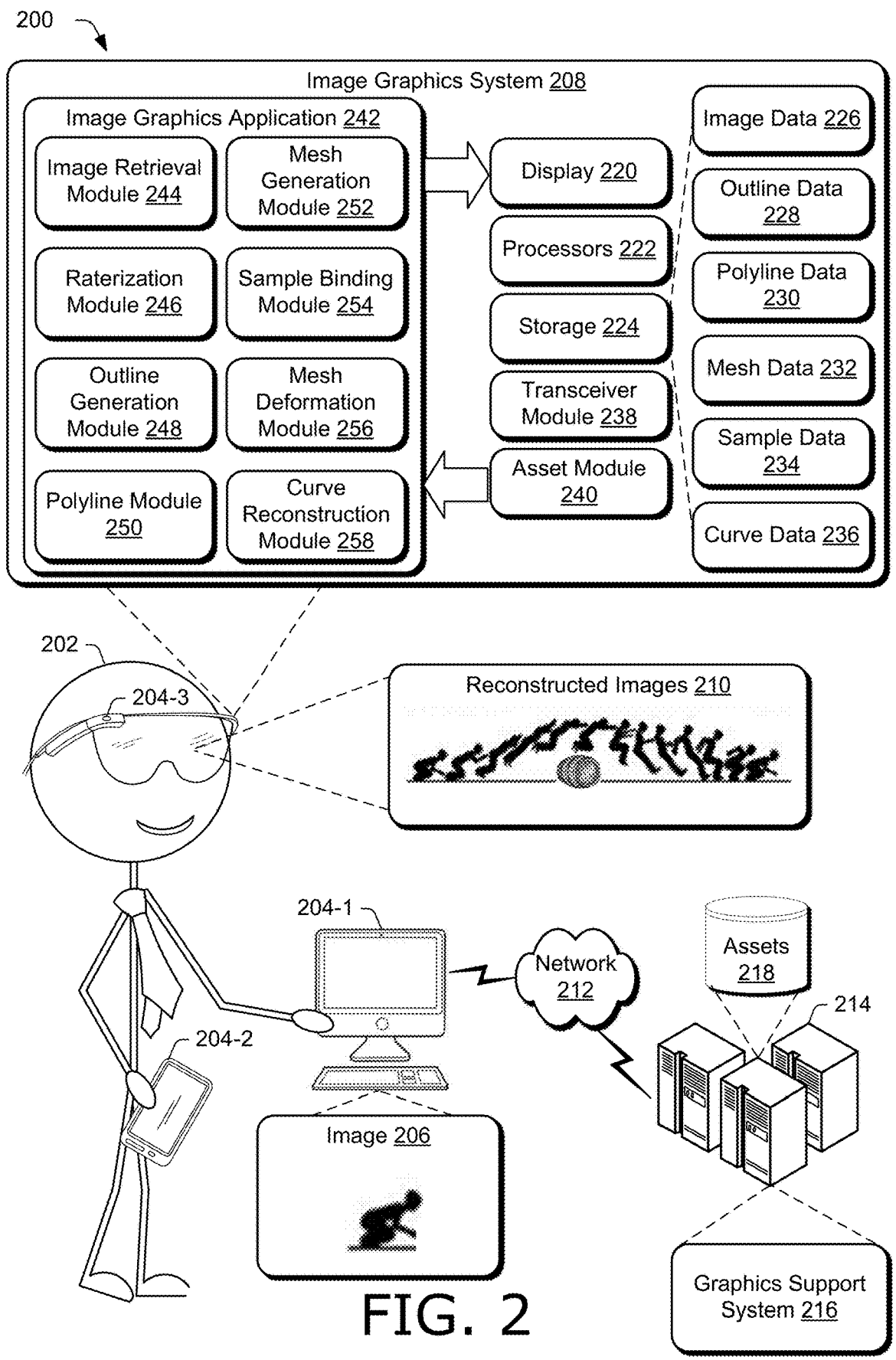
FIG. 2 illustrates a digital medium environment in an example implementation that is operable to employ techniques described herein.

FIG. 2 is an illustration of a digital medium environment 200 in an example implementation that is operable to employ techniques described herein. As used herein, the term "digital medium environment" refers to the various computing devices and resources that can be utilized to implement the techniques described herein. The illustrated digital medium environment 200 includes a user 202 having at least one computing device. In the example in FIG. 2, user 202 is illustrated as having three computing devices, computing devices 204-1, 204-2, and 204-3 (collectively 204). For instance, computing device 204-1 depicts a desktop computer, computing device 204-2 depicts a tablet or smart phone, and computing device 204-3 depicts a pair of eye glasses (e.g., smart goggles). Computing devices 204 are example computing devices, and any suitable computing device is contemplated, such as a mobile phone, tablet, laptop computer, desktop computer, gaming device, goggles, glasses, camera, digital assistant, echo device, image editor, non-linear editor, digital audio workstation, copier, scanner, and the like. Furthermore, discussion of one of computing devices 204 is not limited to that computing device, but generally applies to each of the computing devices 204. Moreover, computing devices 204 may range from full resource devices with substantial memory and processor resources (e.g., personal computers, game consoles) to a low-resource device with limited memory or processing resources (e.g., mobile devices).

Various types of input devices and input instrumentalities can be used to provide input to computing devices 204. For example, computing devices 204 can recognize input as being a mouse input, stylus input, touch input, input provided through a natural user interface, and the like. Thus, computing devices 204 can recognize multiple types of gestures including touch gestures and gestures provided through a natural user interface. In one example, computing devices 204 include speech recognition, identification, and synthesis functionalities, microphones, and speakers that allow computing devices 204 to communicate with user 202 in a conversation, e.g., a user conversation.

Figure 13:
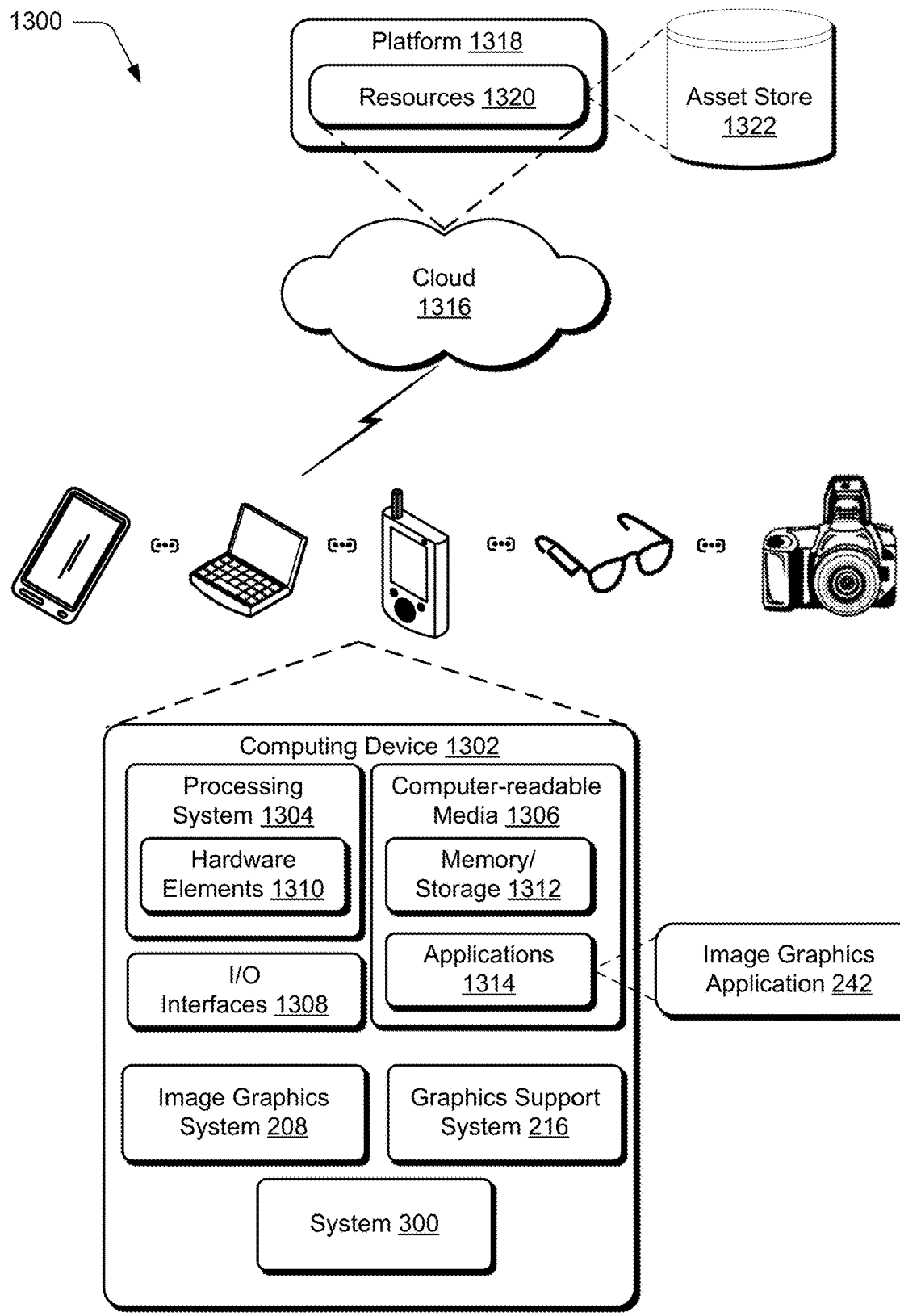
FIG. 13 illustrates an example system including various components of an example device that can be implemented as any type of computing device as described and/or utilized with reference to FIGS. 1-12 to implement aspects of the techniques described herein.

Furthermore, computing devices 204 may be representative of one or a plurality of different devices, such as one or more devices connected to a network that perform operations "over the cloud" as further described in relation to FIG. 13. In one example, computing devices 204 are communicatively coupled to each other, such as with a low power wireless communication standard (e.g., a Bluetooth® protocol). For instance, computing device 204-1 can communicate wirelessly with computing device 204-2 and computing device 204-3. Hence, an asset (e.g., image, video, text, drawing, document, file, and the like) generated, processed (e.g., edited), or stored on one device (e.g., computing device 204-1) can be communicated to, and displayed and processed on another device (e.g., computing device 204-3).

In the example illustrated in FIG. 2, computing device 204-1 obtains image 206. Image 206 is an example of an asset, and can be obtained in any suitable way, such as from another computing device, from file storage on computing device 204-1, and the like. In one example, image 206 is represented by curves, such as n-th order polynomial splines, (e.g., n=1, 2, 3, or 4), Bezier segments, combinations thereof, and the like. In the example in FIG. 2, user 202 edits image 206 with image graphics system 208 to generate reconstructed images 210. For instance, image graphics system 208 generates a triangle mesh for image 206 which user 202 deforms to produce reconstructed images 210 (discussed in more detail below). Reconstructed images 210 can include any number of reconstructed images generated with image graphics system 208 based on image 206. In the example in FIG. 2, image 206 depicts a person crouching, and reconstructed images 210 includes the person crouching as displayed in image 206, followed by twelve reconstructed images in an animation sequence of the person jumping over a barrel.

Computing devices 204 are also coupled to network 212. Network 212 communicatively couples computing devices 204 with server 214 (for clarity, only computing device 204-1 is illustrated in FIG. 2 as coupled to network 212, though computing devices 204-2 and 204-3 can also be coupled to server 214 via network 212). Network 212 may include a variety of networks, such as the Internet, an intranet, local area network (LAN), wide area network (WAN), personal area network (PAN), cellular networks, terrestrial networks, satellite networks, combinations of networks, and the like, and as such may be wired, wireless, or a combination thereof.

Server 214 may include one or more servers or service providers that provide services and/or resources to computing devices 204. Generally, resources provided by server 214 may be licensed, purchased, or may be made freely available, (e.g., without authentication, license, or account-based access). The resources can include any suitable combination of services and content, such as made available over network 212 by one or more providers. Some examples of services include, but are not limited to, an on-line shopping service, a photo editing service, a web development and management service, a collaboration service, a social networking service, a messaging service, an advertisement service, a graphics design service, an image storage service (including storage of photos, documents, records, files, and the like), a graphics editing service, an asset distribution service, and so forth. Content may include various combinations of assets, including videos, ads, audio, multi-media streams, animations, images, web documents, web pages, applications, device applications, text documents, drawings, presentations, stock photographs, user profiles, user preferences, user data (e.g., images stored in an image gallery), maps, computer code, and the like. Assets may be made available to image graphics system 208, graphics support system 216, or combinations thereof, and stored at assets 218 of server 214. Hence, image 206 can include any suitable image of an asset stored at assets 218 of server 214.

Furthermore, server 214 includes graphics support system 216 configurable to receive signals from computing devices 204, process the received signals, and send the processed signals to computing devices 204 to support generating a triangle mesh for an image represented by curves, and generating reconstructed curves from a deformed mesh. For instance, computing device 204-1 may obtain an image represented by curves, generate a triangle mesh for the image, receive user inputs to deform the mesh, and communicate any suitable data (e.g., triangle locations in a deformed mesh and barycentric coordinates of samples of the curves with respect to a triangle in the triangle mesh) to server 214. Server 214, using graphics support system 216, may calculate new positions of the samples of the curves from the triangle locations and barycentric coordinates, and generate reconstructed curves (e.g., new Bezier curves) from the new positions. Server 214 may then provide a reconstructed image with the reconstructed curves back to computing device 204-1, which can display the reconstructed image. Accordingly, graphics support system 216 of server 214 can include a copy of image graphics system 208, including image graphics application 242 (discussed below in more detail).

Computing devices 204 include image graphics system 208 to generate a triangle mesh for an image represented by curves, deform the triangle mesh, and generate reconstructed curves for the image from the deformed mesh. For clarity, computing device 204-3 is illustrated in FIG. 2 as including image graphics system 208, though computing device 204-1 and computing device 204-2 also include copies of image graphics system 208 (not shown).

Image graphics system 208 includes a display 220. Display 220 can expose any suitable data used by or associated with image graphics system 208. In one example, display 220 displays a user interface for exposing assets, images, triangle meshes, metadata (e.g., edge lists, locations of vertices of triangles in a triangle mesh, barycentric coordinates of samples of curves of an image with respect to a triangle in a mesh, etc.) polylines, outlines, handles, anchors, combinations thereof, and the like. Display 220 can expose a user interface configurable to edit an image, such as by deforming a mesh. Display 220 can include any suitable type of display, such as a touchscreen, liquid crystal display, plasma display, head-mounted display, projector and screen, and the like.

Image graphics system 208 also includes processors 222. Hence, image graphics system 208 may be implemented at least partially by executing instructions stored on storage 224 on processors 222. For instance, processors 222 may execute portions of image graphics application 242.

Storage 224 can be any suitable type of storage accessible by or contained in image graphics system 208. Storage 224 stores and provides access to and from memory included in storage 224 for any suitable type of data. For instance, storage 224 includes image data 226 (e.g., curves of an image, graphics of the image generated according to the curves (e.g., adding color), a rasterized image, such as a bitmap, pixel data, or combinations thereof, metadata of an image, such as data governing usage rights of the image, a source location of the image, number of curves representing the image, types of curves presenting the image, date an image was generated, etc., a grayscale version of an image, a copy of an image, and the like).

Storage 224 also includes outline data 228 (e.g., data indicating one or more outlines of one or more objects in (e.g., portions of) an image, pixels of an image included in an outline (e.g., a pixel chain), inflation parameters of an outline, such as a number of pixels an outline has been inflated, indications of whether an outline is disjoint, suggestions for numbers of pixels to inflate an outline so it will no longer be disjoint, and the like).

Storage 224 also includes polyline data 230 (e.g., edge lists indicating vertices of polylines, numbers of polylines, lengths of polylines, indicators of outlines (e.g., an outline number) to which polylines belong, indicators of whether a polyline includes a singularity condition, such as self-overlapping polylines (e.g., polylines that are collinear and overlap), inflation parameters used to inflate one or more polylines, and the like).

Storage 224 also includes mesh data 232 (e.g., descriptions of primitives (e.g., triangles) in a mesh, such as triplets of coordinates of vertices, each triplet representing a triangle in the mesh, numbers of triangles in a mesh, parameters of triangles, such as angles of triangles, areas (e.g., numbers of pixels) covered by triangles, constraints used when generating a mesh, such as a minimum angle of triangles in the mesh, maximum size of a triangle, indicators of algorithms or parameters of algorithms used to generate the mesh, handles (e.g., user-inserted handles) at vertices of the mesh operable to deform the mesh (e.g., a user may select and drag a handle to deform the mesh), anchors (e.g., user-inserted anchors) at vertices of the mesh operable to prevent deformation of the mesh (e.g., an anchor point may remain at a fixed position and the mesh can be deformed by rotating the mesh about the position, rather than moving the anchor from the position), a number of disjoint meshes in an image, indicators of whether two or more meshes have been joined, indicators of meshes that are to be maintained as separate meshes (e.g., not joined with other meshes), inflation parameters of meshes, and the like).

Storage 224 also includes sample data 234 (e.g., data pertaining to samples of curves of an image, such as numbers of samples per curve or segment of a curve (e.g., polynomial portion making up a spline), coordinates of samples with respect to a triangle in a mesh (e.g., barycentric coordinates), constraints used to generate the samples, such as minimum or maximum number of samples per segment, spacings between samples, resolution of values used to represent the samples (e.g., bit-widths of sample values), tuples including an index of a respective triangle mesh, an index of a respective triangle in the mesh, and barycentric coordinates of a sample with respect to the respective triangle, and the like).

Storage 224 also includes curve data 236 (e.g., data regarding curves of an image, such as a number of curves, types of curves, representations of curves (e.g., spline data), locations of curves, orders of polynomials of curves, basis points of Bezier segments, differences of curves (e.g., differences of original curves of an image and reconstructed curves generated by image graphics system 208 based on a deformed mesh), lists of curves, and the like.

Furthermore, image graphics system 208 includes transceiver module 238. Transceiver module 238 is representative of functionality configured to transmit and receive data using any suitable type and number of communication protocols. For instance, data within image graphics system 208 may be transmitted to server 214 with transceiver module 238. Furthermore, data can be received from server 214 with transceiver module 238. Transceiver module 238 can also transmit and receive data between computing devices 204.

Image graphics system 208 also includes asset module 240. Asset module 240 is representative of functionality configured to maintain assets. For instance, asset module 240 can manage image libraries of a user, including images stored in a user's image editing application. Furthermore, asset module 240 integrates assets a user manipulates on or from one of computing devices 204 into a gallery of assets stored on storage 224, such as images a user posts in a social media post or blog from one of computing devices 204, images a user has attached to an email, text, or other communication sent from or received by computing devices 204, and the like. Asset module 240 also manages and stores assets processed by image graphics system 208. Asset module 240 makes assets from galleries maintained by asset module 240 available to image graphics application 242. By maintaining and managing suitable assets (e.g., assets preferred by a user), asset module 240 can quickly and efficiently provide assets to image graphics application 242. In one example, assets maintained by asset module 240 are preemptively displayed in a user interface generated by image graphics application 242 as suggestions that can be selected by a user, such as user 202, for inclusion into an editing workflow that uses triangle meshes of images to deform the image, such as in an animation sequence. Assets maintained by asset module 240 can be stored in image data 226.

Image graphics system 208 also includes image graphics application 242. Image graphics application 242 includes image retrieval module 244, rasterization module 246, outline generation module 248, polyline module 250, mesh generation module 252, sample binding module 254, mesh deformation module 256, and curve reconstruction module 258. These modules work in conjunction with each other to generate a triangle mesh for an image represented by curves, and generate reconstructed curves of reconstructed images from a deformed mesh, such as caused by user manipulation of control points (e g, handles and anchors) on the mesh or any suitable transformation of a mesh into a deformed mesh.

Furthermore, though the description of image graphics system 208 and image graphics application 242 describes generating triangle meshes of images, and suitable mesh with any suitable primitive can be generated by image graphics system 208, such as triangles, squares, rectangles, rhombuses, trapezoids, hexagons, polygons, combinations thereof, and the like. Triangle primitives are described as an example of a primitive in a mesh generated by image graphics application 242.

Image retrieval module 244 is representative of functionality configured to obtain an image represented by a plurality of curves. Image retrieval module 244 can obtain any suitable image in any suitable way. In one example, image retrieval module 244 obtains an image from a database of images, such as a gallery maintained by asset module 240 or a database maintained by server 214 in assets 218. Additionally or alternatively, image retrieval module 244 can obtain an image (e.g., a reconstructed image) from storage 224 that has been reconstructed from a deformed mesh by curve reconstruction module 258.

An image obtained by image retrieval module 244 can be any suitable type of image, such as a stand-alone image (e.g., an image not associated with other images), an image in a sequence of images (e.g., an animation sequence, a video, a page in a chapter of a book, a slide in a slideshow, and the like), or combinations thereof. In one example, an image obtained by image retrieval module 244 is extracted from an asset that contains other types of media than images, such as a web page containing images and text.

Furthermore, curves of an image obtained by image retrieval module 244 can include any suitable type of curves, such as a spline including piecewise segments of Bezier curves, polynomials of any suitable order (e.g., quadratic, cubic, quartic, etc.), lines, primitive shapes such as squares, rectangles, triangles, circles, ellipses, polygons, combinations thereof, and the like. In one example, image retrieval module 244 obtains an image represented by curves including Bezier segments. Additionally or alternatively, image retrieval module 244 obtains an image represented by cubic splines.

An image obtained by image retrieval module 244, along with any suitable information, such as a source location of the image, a file format of the image, an indication whether the image is related to other images, such as a sequence number in an animation sequence, image metadata (e.g., information regarding curves representing an image) and the like, used by or calculated by image retrieval module 244 are stored in image data 226 of storage 224 and made available to modules of image graphics application 242. In one example, image retrieval module 244 provides an image to rasterization module 246 and curves of an image to sample binding module 254.

Rasterization module 246 is representative of functionality configured to rasterize an image into a rasterized image. A rasterized image generated by rasterization module 246 can be any suitable type of rasterized image, such as a bit map, pixel values, dot matrix data structure, combinations thereof, and the like. In one example, a rasterized image includes a grayscale image with a transparency parameter (e.g., alpha channel) to represent transparency of pixels in the image with a percentage of the transparency parameter. Furthermore, a rasterized image generated by rasterization module 246 can include any suitable number of raster elements (e.g., pixels) whose values are represented by any suitable type of data, such as a number of bits, values in a coordinate system (e.g., a color coordinate system), combinations thereof, and the like.

Rasterization module 246 can rasterize an image in any suitable way, such as based on user-specified parameters (e.g., a user-designated resolution in terms of numbers of pixels), based on analyzing an image (e.g., for spectral content) and determining a resolution based on results of the analyzing (e.g., using a higher number of pixels for images with higher spectral content than images with lower spectral content), according to a default resolution, and the like.

A rasterized image generated by rasterization module 246, along with any suitable information, such as a number of raster elements (e.g., pixels) in the rasterized image, metadata of the image, an indicator of a rasterization method used to generated the rasterized image, transparency parameters and the like, used by or calculated by rasterization module 246 are stored in image data 226 of storage 224 and made available to modules of image graphics application 242. In one example, rasterization module 246 provides a rasterized image to outline generation module 248.

Outline generation module 248 is representative of functionality configured to generate one or more outlines of one or more respective portions of a rasterized image. One or more portions of a rasterized image may be determined by a user, such as selected in a user interface exposed by display 220. In one example, one or more portions of a rasterized image are determined automatically and without user intervention by outline generation module 248 by analyzing content of the rasterized image, such as with a neural network trained to distinguish objects in an image.

An outline generated by outline generation module 248 includes a chain of pixels. An outline of an object or portion of an image denotes a boundary of the object or portion of the image. Hence, pixels interior to the outline represent the object or portion of the image, while pixels exterior to the outline do not represent the object or portion of the image.

Outline generation module 248 can generate one or more outlines in any suitable way. In one example, first outlines are determined from a grayscale rasterized image, such as corresponding to an object in the image, portion of the image, or combinations thereof. Outline generation module 248 then inflates the first outlines by merging outlines lying in proximity less than an inflation amount. For instance, outlines within an amount of pixels (e.g., 3 pixels) of one another are merged into one outline. An inflation amount (e.g., 3 pixels) can be user-selectable or automatically determined (e.g., without user intervention) by outline generation module 248. Additionally or alternatively, outline generation module 248 can detect that two or more disjoint outlines have been generated for a same object in an image, and inflate the disjoint outlines to merge the disjoint outlines into a single outline for the object.

In one example, outlines generated by outline generation module 248 are exposed in a user interface by display 220 and can be edited by a user, such as to correct or refine an outline. For instance, a user may select an outline and drag it to change its shape, position, or combinations thereof so that the outline better corresponds to a desired object or portion of the image.

An outline generated by outline generation module 248, along with any suitable information, such as a number of outlines, an indicator of each outline, indications of pixels included in an outline, inflation values used to determine an outline, and the like, used by or calculated by outline generation module 248 are stored in outline data 228 of storage 224 and made available to modules of image graphics application 242. In one example, outline generation module 248 provides outlines to polyline module 250.

Polyline module 250 is representative of functionality configured to determine an edge list indicating a plurality of polylines representing outlines generated by outline generation module 248. An edge list determined by polyline module can be any suitable format and style of edge list. In one example, an edge list includes vertices of the polylines (e.g., start and stop points of each polyline) and indications of how the polylines are connected. For instance, an edge list for a square outline may include four vertices (e.g., the corners of the square) and instructions to connect the four corners of the square with four polylines that do not include a diagonal polyline. Hence, an edge list determined by polyline module 250 describes how the polylines are connected to one another by connecting one end of each polyline to another respective polyline, so that the resulting shape of the connected polylines represents an outline generated by outline generation module 248. Rather than describe the outline by a chain of pixels, which can require a significant amount of memory and resources, polyline module 250 reduces the representation of the outline to a set of connected polylines, represented in an edge list, which requires significantly fewer resources than a chain of pixels.

In one example, polyline module 250 determines an edge list of an outline using a Ramer-Douglas-Peucker (RDP) algorithm to reduce the outline to a connected set of polylines and representing the polylines in an edge list. An RDP algorithm is an algorithm for reducing the number of points in a curve that is approximated by a series of points. For instance, an RDP algorithm can be implemented as an iterative end-point fit algorithm that takes a curve composed of line segments and finds a similar curve with fewer points.

Furthermore, polyline module 250 may automatically and without user intervention detect a singularity condition of polylines represented in an edge list, such as a condition that would hinder mesh generation or cause mesh generation to fail. One example of a singularity condition is self-overlapping polylines, e.g., collinear polylines that overlap along a line. In response to detecting a singularity condition, polyline module 250 may automatically and without user intervention inflate one or more polylines to correct the singularity condition such as causing self-overlapping polylines to no longer overlap along a line (described below in more detail with respect to FIG. 5). Additionally or alternatively, polyline module 250 may provide a correction mechanism for a user to move an endpoint of one or more polylines, and thus modify the shape and position of the boundary represented by the connected polylines. In response to a modification to one or more polylines, automatically or initiated by a user, polyline module 205 generates an edge list for the modified polylines.

An edge list generated by polyline module 250, along with any suitable information, such as a number of polylines per outline, a number of outlines, an indicator of an outline to which a polyline belongs, or edge list pertains, a number of iterations performed by an RDP algorithm to generate an edge list, inflation values used to determine an edge list, and the like, used by or calculated by polyline module 250 are stored in polyline data 230 of storage 224 and made available to modules of image graphics application 242. In one example, polyline module 250 provides an edge list to mesh generation module 252.

Mesh generation module 252 is representative of functionality configured to generate a mesh. Mesh generation module 252 generates a respective mesh (e.g., triangle mesh) for each of one or more outlines generated by outline generation module 248. For instance, each outline is represented by connected polylines indicated in an edge list generated by polyline module 250, and mesh generation module 252 generates a mesh based on the connected polylines indicated in the edge list. Mesh generation module 252 generates a mesh for a region of the image enclosed by polylines connected according to an edge list received by polyline module 250. Mesh generation module 252 can generate any suitable type of mesh, such as a triangle mesh (e.g., a mesh composed of triangle primitives).

Mesh generation module 252 can generate a mesh in any suitable way. In one example, mesh generation module 252 generates a mesh based on a Delaunay triangulation, as described in Triangle: Engineering A 2D Quality Mesh Generator and Delaunay Triangulator by Shewchuk, J. R. (1996), Applied Computational Geometry Towards Geometric Engineering, Lecture Notes in Computer Science, vol. 1148, pp. 203-222, Springer, Berlin, Heidelberg, the disclosure of which is incorporated herein by reference in its entirety.

Mesh generation module 252 can generate a mesh based on any suitable constraints, such as constraining triangles of the mesh to have at least a minimum angle (e.g., 20 degrees), constraining triangles of the mesh to include no more than a maximum number of pixels of a rasterized image (e.g., no more than 256 pixels), constraining triangles of the mesh to include at least a minimum number of pixels of a rasterized image (e.g., at least 32 pixels), combinations thereof, and the like.

Moreover, mesh generation module 252 can add control points (e.g., handles and anchors) to vertices of triangles of a mesh generated by mesh generation module 252. Handles can be inserted by a user at a triangle vertice, and are operable to deform the mesh. For instance, a user may select and drag a handle to deform the mesh. Anchors can also be inserted by a user at a triangle vertice, and are operable to prevent deformation of the mesh. As an example, an anchor point may remain at a fixed position and the mesh can be deformed by rotating the mesh about the position, rather than moving the anchor from the position when the mesh is deformed.

Mesh generation module 252 can represent a mesh in any suitable way. In one example, mesh generation module 252 represents a mesh with triplets of vertices (e.g., coordinates of vertices), each triplet representing a triangle in the mesh. Additionally or alternatively, a list of vertices of the mesh and their locations (e.g., coordinates) can be generated by mesh generation module 252, and each triangle in the mesh can be represented by a triplet of indices of vertices (e.g., numbers on the list of vertices). Coordinates of the vertices can be determined from the list of vertices.

Furthermore, mesh generation module 252 can maintain meshes as separate meshes. For instance, a user may indicate that a mesh is to remain separate from another mesh (e.g., not be merged with another mesh). As an example, a user may wish to keep a mesh representing a first object (e.g., a lizard) separate from a mesh of another object (e.g., a fly) in an image of a lizard eating a fly, so that deforming the lizard to move the lizard does not distort the fly. Additionally or alternatively, mesh generation module 252 can merge two or more meshes into a single mesh. For instance, a user may indicate to inflate one or more meshes to merge meshes into a single mesh. As an example, a mesh of a horse may be joined with a mesh of a buggy being towed by the horse so that a single mesh can be deformed to modify both the horse and buggy.

Since mesh generation module 252 generates a mesh based on polylines described in an edge list to represent an outline of an image (or portion of an image), rather than curves representing graphics (e.g., vector graphics) of the image, the density of the mesh (e.g., number of triangles in the mesh) generated by mesh generation module 252 is independent from the density of the curves representing the image (e.g., the number of curves representing the image). Consequently, mesh generation module 252 generates a mesh that is uniform and smooth (e.g., triangles can be roughly a same size, and the number of triangles is not so large as to require prohibitively large computations or storage).

A mesh generated by mesh generation module 252, along with any suitable information, such as a number of meshes, a number of triangles per mesh, triplets indicating triangles in the mesh, inflation values used to determine merged meshes, indicators of meshes to be maintained as separate meshes, and the like, used by or calculated by mesh generation module 252 are stored in mesh data 232 of storage 224 and made available to modules of image graphics application 242. In one example, mesh generation module 252 provides a mesh to sample binding module 254 and mesh deformation module 256.

Sample binding module 254 is representative of functionality configured to bind curves representing the image to the mesh. Sample binding module 254 binds curves to a mesh by sampling the curves and binding the samples of the curves to the mesh. Samples of the curves can be determined in any suitable way. In one example, sample binding module 254 generates samples of curves representing an image adaptively based on a length of the curve or a length of a segment of a curve (e.g., a length of a polynomial in a spline). For instance, the number of samples per curve or per segment can be determined from the length of the curve (e.g., a longer curve may be sampled with more samples and different sample spacing than a shorter curve).

Sample binding module 254 can bind curves to the mesh in any suitable way. In one example, sample binding module 254 binds a plurality of curves to the mesh by representing samples of the plurality of curves with coordinates of the samples with respect to a respective triangle in a mesh. For instance, sample binding module 254 determines for a sample generated by sample binding module 254 a respective mesh index (e.g., an indicator of a mesh when multiple meshes are included) and a respective triangle in a mesh which contains the sample (e.g., the sample lies within the respective triangle in the mesh). Sample binding module 254 then determines coordinates of the sample with respect to the respective triangle in the mesh.

Coordinates of a sample with respect to a triangle can be any suitable coordinates that can be used to determine a position of the sample from a position of the triangle. In one example, sample binding module 254 determines barycentric coordinates for a sample with respect to a respective triangle in a mesh. Barycentric coordinates are a set of numbers that uniquely describe a location of a point in a triangle with respect to the vertices of the triangle. For instance, consider a triangle defined by its three vertices $r_1$, $r_2$, and $r_3$. A point r located inside the triangle can be written as a unique linear, convex combination of the three vertices $r_1$, $r_2$, and $r_3$. That is, there exists a unique set of three non-negative numbers $\lambda_1$, $\lambda_2$, and $\lambda_3$ which sum to unity (e.g., $\lambda_1+\lambda_2+\lambda_3=1$), such that $$r=\lambda_1 \cdot r_1+\lambda_2 \cdot r_2+\lambda_3 \cdot r_3.$$

The set of numbers $\lambda_1$, $\lambda_2$, and $\lambda_3$ are the barycentric coordinates of the point r with respect to the triangle defined by the vertices $r_1$, $r_2$, and $r_3$. Thus, any point within a triangle can be represented by its barycentric coordinates with respect to the triangle.

In terms of Cartesian coordinates, e.g., r=(x, y), the barycentric coordinates of the point r are expressed as linear, convex combinations of the components of the vertices of the triangle, or $$x=\lambda_1 \cdot x_1+\lambda_2 \cdot x_2+\lambda_3 \cdot x_3$$

$$y=\lambda_1 \cdot y_1+\mu_2 \cdot y_2+\lambda_3 \cdot y_3$$

where $r_i=(x_i, y_i)$, i=1, 2, 3.

Additionally or alternatively, sample binding module 254 can determine barycentric coordinates for samples of curves that are not located in a triangle in a mesh. For instance, in cases where a mesh is not generated by mesh generation module 252 to cover an entire image, a region of the image can contain samples of curves that do not lie within a triangle of the mesh. Such a condition can occur when a clipping path exists that obscures a portion of the image (discussed below in more detail with respect to FIG. 9). To bind these uncovered samples to the mesh, despite the samples not being covered by the mesh, sample binding module 254 determines a nearest triangle in the mesh to the sample, and binds the sample to the nearest triangle by generating barycentric coordinates of the sample with respect to the nearest triangle in the mesh. Since the sample does not lie within the nearest triangle, the barycentric coordinates can be greater than unity or less than zero (e.g., negative), but the condition that the barycentric coordinates sum to unity still holds. This does not prevent curve reconstruction module 258 from determining locations of samples in a deformed mesh from locations of vertices of triangles in the deformed mesh and the barycentric coordinates of the samples, despite one or more of the barycentric coordinates being greater than unity or negative.

In one example, to speed the binding process and efficiently determine a respective triangle in a mesh to bind a sample to, sample binding module 254 uses a bounding volume hierarchy. Rectangles are determined as bounding volumes for triangles in the triangle mesh, and the rectangles of the bounding volume hierarchy structure are searched to determine a respective triangle in the mesh. Searching a rectangle can include breaking the rectangle into quadrants and determining if a sample is in a respective quadrant, and determining a respective triangle associated with the respective quadrant. By using a bounding volume hierarchy to determine if a sample is first in a respective quadrant of a rectangle, and then associating a triangle with the respective quadrant, instead of directly searching triangles to determine a respective triangle to bind a sample to, sample binding module 254 can efficiently bind samples of curves to triangles in a triangle mesh, so that image graphics application can generate images (e.g., reconstructed images) in real time (e.g., without perceptible delay to a user).

Furthermore, sample binding module 254 can represent samples of curves and the binding of the samples to a mesh in any suitable way. In one example, sample binding module 254 represents the samples as tuples including an index of a respective triangle mesh (e.g., an image may include multiple meshes for multiple outlines generated by outline generation module 248 and the index denotes one of the multiple meshes), an index of a respective triangle in the respective triangle mesh to which the sample is bound, and coordinates (e.g., barycentric coordinates) of the sample with respect to the respective triangle to which the sample is bound. In one example, tuple representations of samples include all three barycentric coordinates (e.g., $\lambda_1$, $\lambda_2$, and $\lambda_3$) for a respective sample. Additionally or alternatively, a tuple representation of a sample can include only two of three barycentric coordinates (e.g., any two of $\lambda_1$, $\lambda_2$, and $\lambda_3$) for the sample, and the third coordinate can be computed for the sample from the constraint that the barycentric coordinates sum to unity.

Representations of sample binding to a mesh generated by sample binding module 254, along with any suitable information, such as a number of samples outside a mesh bound to triangles inside the mesh, an indication of whether a bounding volume hierarchy was used to accelerate the binding process, numbers of samples bound to each mesh, lengths of curves, lengths of segments of curves, numbers of samples per segments of curves or per curves, tuples of indices of meshes and triangles and barycentric coordinates, and the like, used by or calculated by sample binding module 254 are stored in sample data 234 of storage 224 and made available to modules of image graphics application 242. In one example, sample binding module 254 provides tuples of indices of meshes and triangles and barycentric coordinates to curve reconstruction module 258.

Mesh deformation module 256 is representative of functionality configured to deform a mesh into a deformed mesh. Mesh deformation module 256 can deform a mesh into a deformed mesh in any suitable way. In one example, mesh deformation module 256 deforms a mesh into a deformed mesh with one or more handles on vertices of the mesh. For instance, a user may select a handle and drag the handle, thereby deforming the mesh (e.g., changing the shape and location of some triangles in the mesh). Moreover, a user may deform a mesh with anchor points on the mesh that maintain their location on a deformed mesh. As an example, a user may select a handle and deform a mesh by dragging the handle, which deforms the mesh without moving the anchor point of the mesh.

Furthermore, mesh deformation module 256 can deform a mesh to produce a deformed mesh using any suitable transformation or workflow that operates on a mesh (e.g., a triangle mesh). In one example, a skinning transformation is applied to a mesh by mesh deformation module 256 to produce a deformed mesh. A skinning transformation is described in Fast Automatic Skinning Transformations by Alec Jacobson et al., ACM Transactions on Graphics, Volume 31, Issue 4, Article 77, July 2012, the disclosure of which is incorporated herein by reference in its entirety.

Additionally or alternatively, a workflow using diffusion curves can be applied to a mesh by mesh deformation module 256 to produce a deformed mesh. A workflow using diffusion curves is described in A Vectorial Solver For Free-Form Vector Gradients by S. Boyé et al., ACM Transactions on Graphics, Volume 31, Issue 6, Article 173, November 2012, the disclosure of which is incorporated herein by reference in its entirety.

Additionally or alternatively, a workflow using vector fields can be applied to a mesh by mesh deformation module 256 to produce a deformed mesh. A workflow using vector fields is described in Vector Field Processing On Triangle Meshes by F. do Goes et al., Proceedings SIGGRAPH, Article 17, Kobe, Japan, Nov. 2-6, 2015, ACM, New York, N.Y., the disclosure of which is incorporated herein by reference in its entirety.

In one example, mesh deformation module 256 assigns weights to vertices of a mesh, such as according to how a mesh is distributed over an area or shape. When a mesh is deformed, such as by dragging a handle, mesh deformation module 256 determines new weights for vertices on the mesh based on linear combinations of the weights, and determine new positions of vertices in the deformed mesh based on the new weights.

Additionally or alternatively, a deformed mesh generated by mesh deformation module 256 is generated consistent with constraints applied to the mesh by mesh generation module 252. For instance, mesh deformation module 256 can constrain triangles of a deformed mesh to have at least a minimum angle, to include no more than a maximum number of pixels of a rasterized image, to include at least a minimum number of pixels of a rasterized image, combinations thereof, and the like.

Furthermore, mesh deformation module 256 can represent a deformed mesh in any suitable way. In one example, mesh deformation module 256 represents a deformed mesh with triplets of coordinates of vertices, each triplet representing a triangle in the deformed mesh. Additionally or alternatively, a list of vertices of the deformed mesh and their locations (e.g., coordinates) can be generated by mesh deformation module 256, and each triangle in the deformed mesh can be represented by a triplet of indices of vertices (e.g., numbers on the list of vertices).

A deformed mesh generated by mesh deformation module 256, along with any suitable information, such as data regarding triangles of a deformed mesh (e g, minimum and maximum angles, areas, etc.) triplets indicating triangles of the deformed mesh, a list of transformations, workflows, and edits applied to a mesh to produce a deformed mesh, differences in positions of triangles in a deformed mesh and a mesh used to produce the deformed mesh, and the like, used by or calculated by mesh deformation module 256 are stored in mesh data 232 of storage 224 and made available to modules of image graphics application 242. In one example, mesh deformation module 256 provides a deformed mesh (e.g., triplets of vertices of triangles in the deformed mesh) to curve reconstruction module 258.

Curve reconstruction module 258 is representative of functionality configured to reconstruct curves of an image from the deformed mesh, and generate a reconstructed image from the reconstructed curves. Curve reconstruction module 258 can reconstruct curves of an image in any suitable way. In one example, curve reconstruction module 258 determines new positions of samples of curves generated in sample binding module 254 from locations of a respective triangle in the deformed mesh to which a sample is bound and the coordinates (e.g., barycentric coordinates) of the samples with respect to the respective triangle. For instance, once a mesh is deformed, vertices of triangles may change positions in the deformed mesh, relative to the mesh before deformation. Since the barycentric coordinates of a sample bind the sample to a triangle in the mesh, using the barycentric coordinates and the new positions of the vertices of a respective triangle in the deformed mesh, new positions of the samples in the deformed mesh can be determined. Curve reconstruction module 258 can then generate reconstructed curves from the new positions of the samples. Generating reconstructed curves can include determining basis points of curves (e.g., Bezier splines, Bezier segments, polynomials, and the like) from the new positions of the samples. For instance, curve fitting, such as by minimizing a mean squared error, can be performed to get new basis points of Bezier segments based on the new positions of the samples determined by curve reconstruction module 258.

Curve reconstruction module 258 generates a reconstructed image from the reconstructed curves. Curve reconstruction module 258 can generate a reconstructed image from the reconstructed curves in any suitable way. In one example, curve reconstruction module 258 integrates the reconstructed curves into a reconstructed image represented by the reconstructed curves. Additionally or alternatively, curve reconstruction module 258 can apply graphics to a reconstructed image, such as by adding color, shading, patters, and the like, based on the reconstructed curves (e g, filling in a region between curves with a specified color).

Reconstructed curves and a reconstructed image generated by curve reconstruction module 258, along with any suitable information, such as curve fitting data, sample locations, basis points, and the like, used by or calculated by curve reconstruction module 258 are stored in curve data 236 of storage 224 and made available to modules of image graphics application 242. In one example, curve reconstruction module 258 provides reconstructed curves of a reconstructed image to display 220 to be exposed in a user interface.

Having considered an example digital medium environment, consider now a discussion of an example system usable to generate a triangle mesh of an image in accordance with one or more aspects of the disclosure.

Example Image Graphics System

Figure 3:
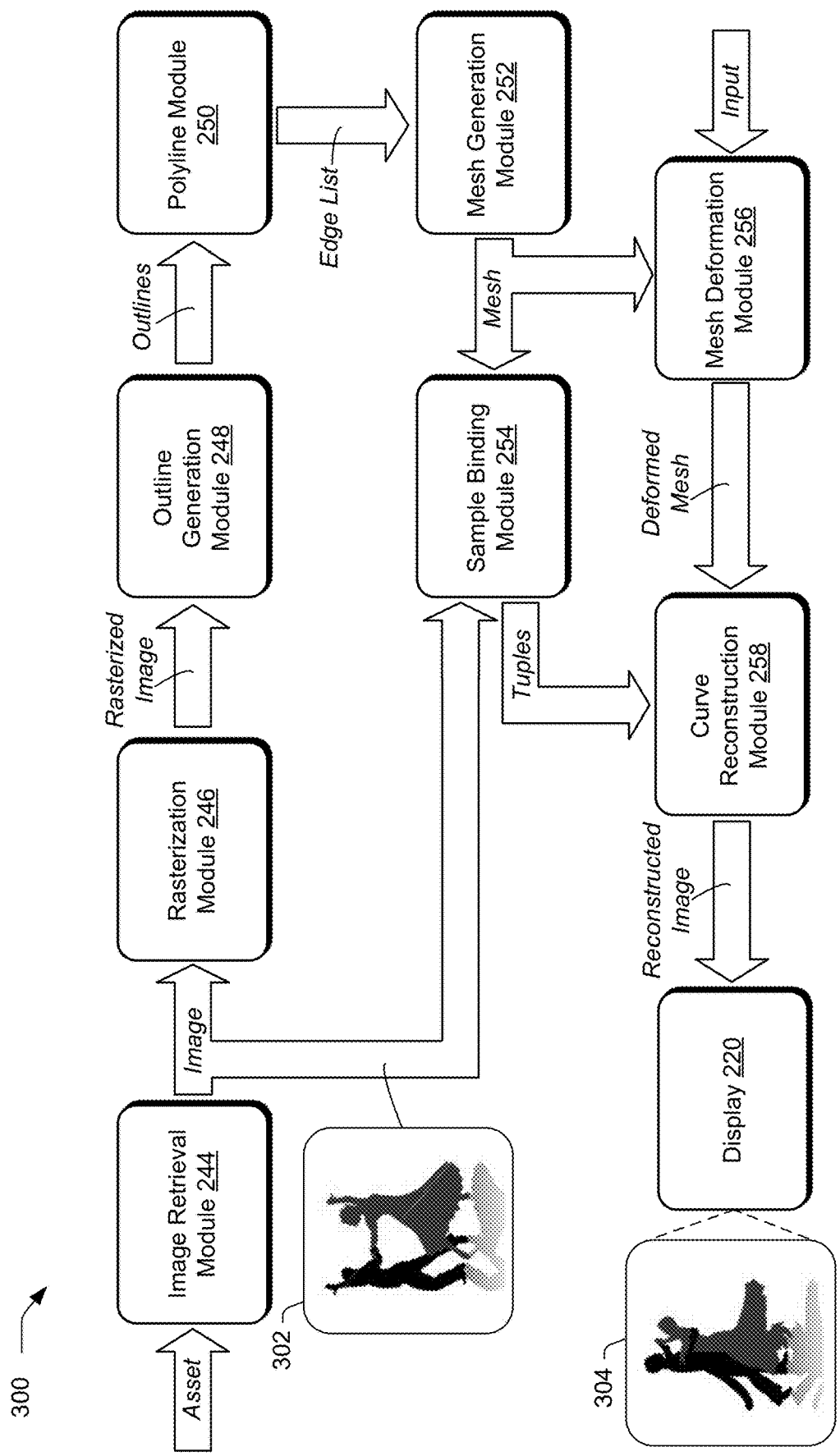
FIG. 3 illustrates an example system usable to generate a triangle mesh of an image in accordance with one or more aspects of the disclosure.

FIG. 3 illustrates an example system 300 usable to generate a triangle mesh of an image in accordance with one or more aspects of the disclosure. In this implementation, system 300 includes the modules of image graphics application 242 as described in FIG. 2, e.g., image retrieval module 244, rasterization module 246, outline generation module 248, polyline module 250, mesh generation module 252, sample binding module 254, mesh deformation module 256, and curve reconstruction module 258. System 300 is one example of image graphics system 208 that can be constructed using the modules of image graphics application 242. For instance, signals can be redefined, and modules can be modified, combined, divided, added, or removed to form a modified system, without altering the functionality of system 300. Accordingly, such modified systems are considered to be within the scope of the disclosure.

Furthermore, for simplicity system 300 is limited to the modules of image graphics application 242 and a description of some of their interconnects. System 300 can, however, include any suitable signals and communications between modules omitted for simplicity. Such signals may include system clocks, counters, asset or image indicators, sequence indicators, reset signals, and the like. In one example, system 300 can operate in real time (e.g., with no perceptible delay to a user once a user selection is received). Accordingly, signals can be calculated by the modules of system 300 and communicated between the modules of system 300 without significant delay, so that a triangle mesh can be generated (e.g., a deformed mesh) and curves of an image can be reconstructed from a deformed mesh without perceptible delay to a user.

Moreover, system 300 can be implemented on any suitable device or devices. In one example, system 300 is implemented on one computing device (e.g., one of computing devices 204 in FIG. 2). In another example, system 300 is implemented on more than one computing device. For instance, parts of system 300 can be implemented by a first computing device, such as computing device 204-1 in FIG. 2, and other parts of system 300 can be implemented by an additional computing device or devices, such as computing device 204-2. In one example, a server implements parts of system 300, such as server 214 in FIG. 2. A server can be remote, e.g., because it is not collocated with the first computing device. A server may be configured to receive signals of system 300 from a computing device (e.g., one or more of computing devices 204), process the received signals, such as with graphics support system 216, and transmit results of the processing back to the computing device. Hence, graphics support system 216 of server 214 in FIG. 2 may include system 300.

Additionally or alternatively, parts of system 300 can be implemented by an additional computing device that is collocated with a first computing device. For instance, one of computing devices 204 may be a first computing device, and another of computing devices 204 may be an additional, collocated computing device. The first computing device and the additional computing device may be operated by one or more users. Hence, system 300 provides for multiple users within an environment to share data included in system 300. For instance, an image can be obtained and triangle mesh generated for the image by a first computing device operated by a first user, and sent to another computing device operated by a second user. The second user can then deform the mesh (e.g., by applying one or more transformations to the mesh), and send the transformed mesh back to the first user and the first computing device. The first user on the first computing device can then use system 300 to reconstruct curves of the image from the deformed mesh received from the second user on the second computing device. A reconstructed image can be displayed on the first computing device and shared with the second computing device, so both users can review the reconstructed image.

Image retrieval module 244 obtains an asset, such as a web page that includes an image represented by curves. In one example, image retrieval module 244 extracts an image from an asset, such as by removing the image from the asset. For instance, image retrieval module 244 may extract an image from an asset that contains an image and text by removing the image from the asset and discarding the text. Additionally or alternatively, image retrieval module 244 can obtain an image (e.g., an image file, scan, copy, and the like). Image retrieval module 244 provides an image to rasterization module 246 and sample binding module 254.

In the example in FIG. 3, an example of an image obtained by image retrieval module 244 and provided to rasterization module 246 and sample binding module 254 is denoted by image 302, which illustrates a man and woman dancing. An example of a reconstructed image generated from image 302 by system 300 is denoted by image 304, which denotes the man and woman dancing and in different positions than in image 302. Image 302 is generated by system 300 by generating a triangle mesh for image 302, binding samples of curves of image 302 to the triangle mesh, deforming the mesh, and reconstructing the curves from the deformed mesh based on the binding of the samples of the curves to the mesh.

An image represented by curves (e.g., Bezier segments) is obtained by image retrieval module 244 and provided to rasterization module 246. Rasterization module 246 rasterizes the image into a rasterized image (e.g., represented by pixels). Rasterization module 246 may determine a resolution of a rasterized image in any suitable way, such as according to a default value, a user-specified value, or an automatically generated value. In one example, a user specifies a resolution (e.g., a number of horizontal and a number of vertical pixels) for the rasterized image. Additionally or alternatively, rasterization module 246 can analyze an image provided by image retrieval module 244 and determine automatically and without user intervention a resolution for a rasterized image. For instance, rasterization module 246 may determine a resolution for a rasterized image based on curves of the image obtained by image retrieval module 244, such as a number of curves, types of curves, number of segments per curve, order of polynomials of curves, combinations thereof, and the like. Rasterization module 246 provides a rasterized image to outline generation module 248.

Outline generation module 248 receives a rasterized image from rasterization module 246 and generates one or more outlines of one or more respective portions of the rasterized image or one or more respective objects in the rasterized image. An outline can be represented by a chain of pixels forming a boundary of an object in an image, or a region of an image, enclosing the object or region. In one example, outline generation module 248 generates disjoint outlines for a single object or region of the image, and inflates the disjoint outlines to merge the disjoint outlines into one outline for the single object or region of the image. Disjoint outlines can be inflated based on a user instruction, such as an indication by a user to inflate one or more outlines by a prescribed number of pixels (e.g., 3 pixels).

Additionally or alternatively, outline generation module 248 inflates one or more outlines automatically and without user intervention, such as in response to detecting that disjoint outlines of an object have been first determined by outline generation module 248. In one example, outline generation module 248 iteratively inflates one or more outlines by a prescribed amount of pixels each iteration until outline generation module 248 detects that no disjoint outlines of an object remain. Outline generation module 248 provides one or more outlines of one or more respective portions of the rasterized image or one or more respective objects in the rasterized image to polyline module 250.

Polyline module 250 receives one or more outlines from outline generation module 248 and determines at least one edge list indicating a plurality of polylines representing the one or more outlines. In one example, a respective edge list for each of the one or more outlines is determined by polyline module 250. Additionally or alternatively, polyline module determines a single edge list indicating polylines for all of the one or more outlines.

Polyline module can determine an edge list from an outline received by outline generation module 248 in any suitable way. In one example, polyline module 250 applies an RDP algorithm to reduce the number of pixels representing an outline to a number of connected polylines that approximate the outline. Furthermore, polyline module 250 can inflate one or more polylines responsive to detecting a singularity condition (e.g., overlapping polylines along a line). By correcting a singularity condition, system 300 is guaranteed to generate a triangle mesh. Polyline module 250 represents polylines in an edge list (e.g., a list of end points of the polylines and instructions for connecting the polylines) and provides an edge list to mesh generation module 252.

Mesh generation module 252 receives an edge list from polyline module 250 and generates a mesh based on the edge list. A mesh can include a respective triangle mesh for each of the one or more outlines determined by outline generation module 248 based on the edge list received by polyline module 250. In one example, mesh generation module 252 inserts control points on one or more of the vertices of the mesh (e.g., vertices of triangles in the triangle mesh). Control points can include handles and anchor points. Mesh generation module 252 can automatically and without user intervention designate some vertices to include a control point. Additionally or alternatively, mesh generation module 252 can designate vertices of a mesh to include control points based on user instructions (e.g., a mouse click on one or more vertices). In one example, control points are assigned to a mesh based on a transformation applied to a mesh, such as a skinning transformation.

Furthermore, mesh generation module 252 can inflate one or more meshes to join the meshes. For instance, a user may specify an inflation parameter, or indicate regions of meshes to join via an inflation parameter, and mesh generation module 252 may join the meshes (e.g., at the indicated regions) by inflating one or more of the meshes.

Mesh generation module 252 provides a respective representation of one or more meshes, e.g., triplets indicating vertices of triangles in a triangle mesh for each triangle in a respective mesh, to sample binding module 254 and mesh deformation module 256.

Mesh deformation module 256 receives a representation of one or more meshes from mesh generation module 252. Mesh deformation module 256 also receives an input to deform a mesh received by mesh generation module 252. An input can be a user input, such as when a user selects and drags a handle on the mesh to deform the mesh. Additionally or alternatively, an input received by mesh deformation module 256 can be a transformation, such as a skinning transformation, part of a workflow to generate another image, such as an animation sequence, and the like. Mesh deformation module 256 generates one or more deformed meshes based on input received to deform a mesh, and one or more meshes received from mesh generation module 252. Mesh deformation module 256 provides one or more deformed meshes to curve reconstruction module 258.

Sample binding module 254 receives one or more meshes from mesh generation module 252 and an image represented by curves from image retrieval module 244, and binds samples of the curves to one of the meshes. Sample binding module 254 binds the samples of the curves to a mesh by representing the samples with coordinates (e.g., barycentric coordinates) of the samples with respect to a respective triangle in a mesh.

Sample binding module 254 generates samples of curves representing an image obtained by image retrieval module 244 by sampling the curves. Sampling can be done in any suitable way, such as with uniformly-spaced samples (e.g., equal distance along a curve between samples). Additionally or alternatively, sample binding module 254 samples curves adaptively, such as based on a length of a curve, or length of a segment of a curve. For instance, a longer curve may be more heavily sampled (e.g., more samples per curve and more or less distance between sample points) compared to a shorter curve.

In one example, sample binding module 254 binds respective samples of curves to respective triangles in a mesh that do not include the respective samples. For instance, a clipping path may obscure part of an image, for which a mesh is not generated. For this part of the image, sample binding module 254 binds samples of curves not contained in a triangle in a mesh to a nearest triangle in the mesh.

Sample binding module 254 generates data tuples representing the binding of samples of curves to triangles in a mesh. In one example, sample binding module 254 generates tuples for each sample generated by sample binding module 254, including an index of a respective triangle mesh containing a respective triangle to which a sample is bound, an index of the respective triangle to which the sample is bound, and barycentric coordinates of the sample with respect to the respective triangle. Sample binding module 254 provides data tuples, e.g., tuples representing the binding of samples of curves to triangles in a mesh, to curve reconstruction module 258.

Curve reconstruction module 258 receives data tuples from sample binding module 254 and a deformed mesh from mesh deformation module 256, and reconstructs at least some of the curves by determining new positions of the samples from locations of the respective triangle in the deformed mesh and the barycentric coordinates of the samples, and generating reconstructed curves from the new positions of the samples. Generating reconstructed curves can include determining basis points of curves (e.g., Bezier splines, Bezier segments, polynomials, and the like) from the new positions of the samples, such as by fitting a curve fitting to the new positions of the samples to determine new basis points of Bezier segments. Furthermore, curve reconstruction module 258 generates a reconstructed image from the reconstructed curves, such as by integrating the reconstructed curves into a reconstructed image represented by the reconstructed curves and adding color, shading, patterns, combinations thereof, and the like to the reconstructed image. Curve reconstruction module 258 provides a reconstructed image to display 220.

Display 220 receives a reconstructed image from curve reconstruction module 258 and exposes the reconstructed image in a user interface. Furthermore, display 220 can receive any data or object used by or generated by system 300, such as curves of an image, a mesh, a rasterized image, an outline, polylines, an edge list, data tuples, triplets, positions of vertices, barycentric coordinates, and the like, and exposes the data or object in a user interface. In the example in FIG. 3, display 220 exposes image 304, including a man and a woman dancing in different positions from image 302 obtained by image retrieval module 244.

System 300 constitutes an improvement over systems that generate a mesh from a convex hull of a polygon encompassing an image, and systems that generate a mesh by sampling curves of an image and using the sample points as vertices of triangles in a mesh. By generating an outline of an image from a rasterized version of the image, reducing the outline to a set of connected polylines, and generating a triangle mesh according to the connected polylines, a triangle mesh is generated that accurately represents the image (e.g., it covers the image where pixels of the image are exposed), and the complexity of the triangle mesh is decoupled from the complexity of the input curves. Hence, system 300 can efficiently and robustly generate a triangle mesh for images with large numbers of curves (e.g., hundreds of thousands of curves) where systems that directly sample the input curves and use the samples as triangle vertices fail or require a prohibit amount of resources and delay to generate a mesh. Furthermore, by detecting a singularity condition (e.g., self-overlapping polylines) and correcting for the singularity condition, such as by automatically inflating one or more self-overlapping polylines, system 300 automatically configures itself to guarantee that a triangle mesh can be generated. Moreover, by binding samples of curves not covered by a mesh (e.g., because the curves are obscured by a clipping path) to the mesh, system 300 supports workflows that use clipping paths by generating deformed meshes and reconstructed images based on an entire image, not just those parts of an image exposed and covered by a mesh. Hence, an image obscured by a clipping path is more naturally deformed by system 300 than by other systems.

Having considered an example system 300, consider now a discussion of example images in accordance with one or more aspects of the disclosure.

Example Images

Figure 4:
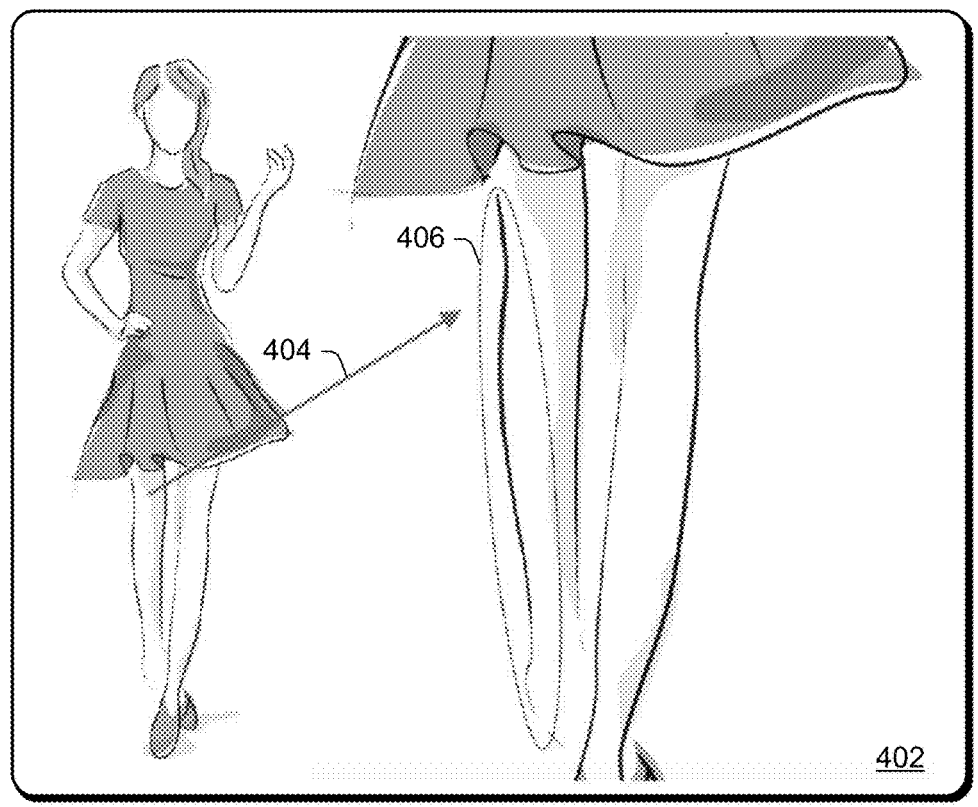
FIG. 4 illustrates example images in accordance with one or more aspects of the disclosure.
Figure 4:
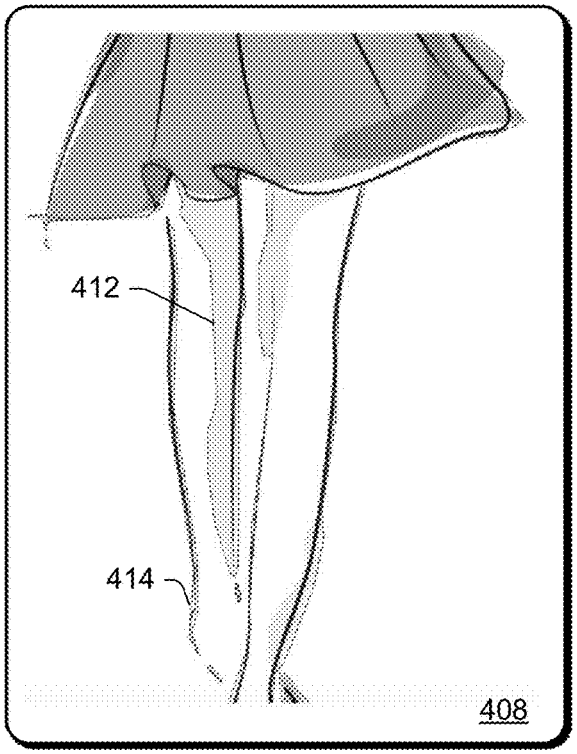
Figure 4:
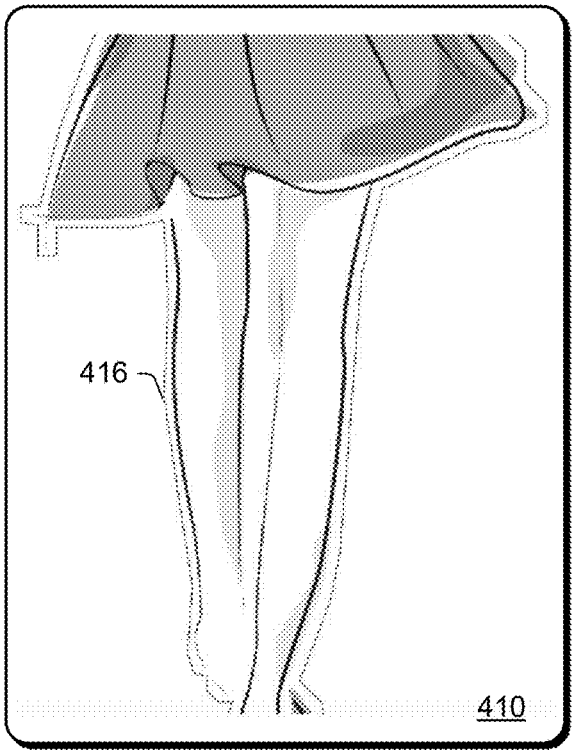

FIG. 4 illustrates example images 400 in accordance with one or more aspects of the disclosure. The example in FIG. 4 illustrates inflating of outlines to merge disjoint outlines into one outline, and can be performed by outline generation module 248 in FIG. 1 and FIG. 2. Images 400 includes image 402 (e.g., a rasterized image). Image 402 corresponds to an image of a woman. As illustrated by arrow 404, the woman's right leg is drawn with disjoint lines (e.g., lines not connected to another part of the woman). For instance, ellipse 406 encloses a part of the woman's right leg that is disjoint from other parts of the woman, such as resulting from being hand drawn. Because image 402 includes an image with disjoint components representing the image, outline generation module 248 can generate disjoint outlines.

For instance, images 400 also includes image 408 (e.g., a rasterized image) that includes two disjoint outlines generated by outline generation module 248, outline 412 and outline 414. Outline 412 encloses the woman, excluding the disjoint portion of her right leg (e.g., the line encircled by ellipse 406), and outline 414 encloses the disjoint portion of the woman's right leg (e.g., the line encircled by ellipse 406). Hence, the disjoint outlines 412 and 414 in image 408 do not accurately represent a single outline of the woman in the image.

Images 400 also includes image 410 (e.g., a rasterized image) that includes a single outline 416 of the woman. In image 410, the two disjoint outlines 412 and 414 of image 408 have been inflated by outline generation module 248 and joined into single outline 416. In the example in FIG. 4, outlines 412 and 414 have each been inflated by 3 pixels, causing outlines 412 and 414 to merge into single outline 416 that accurately represents an outline of the woman (e.g., outline 416 encompasses the pixels of image 410 representing the woman).

Figure 5:
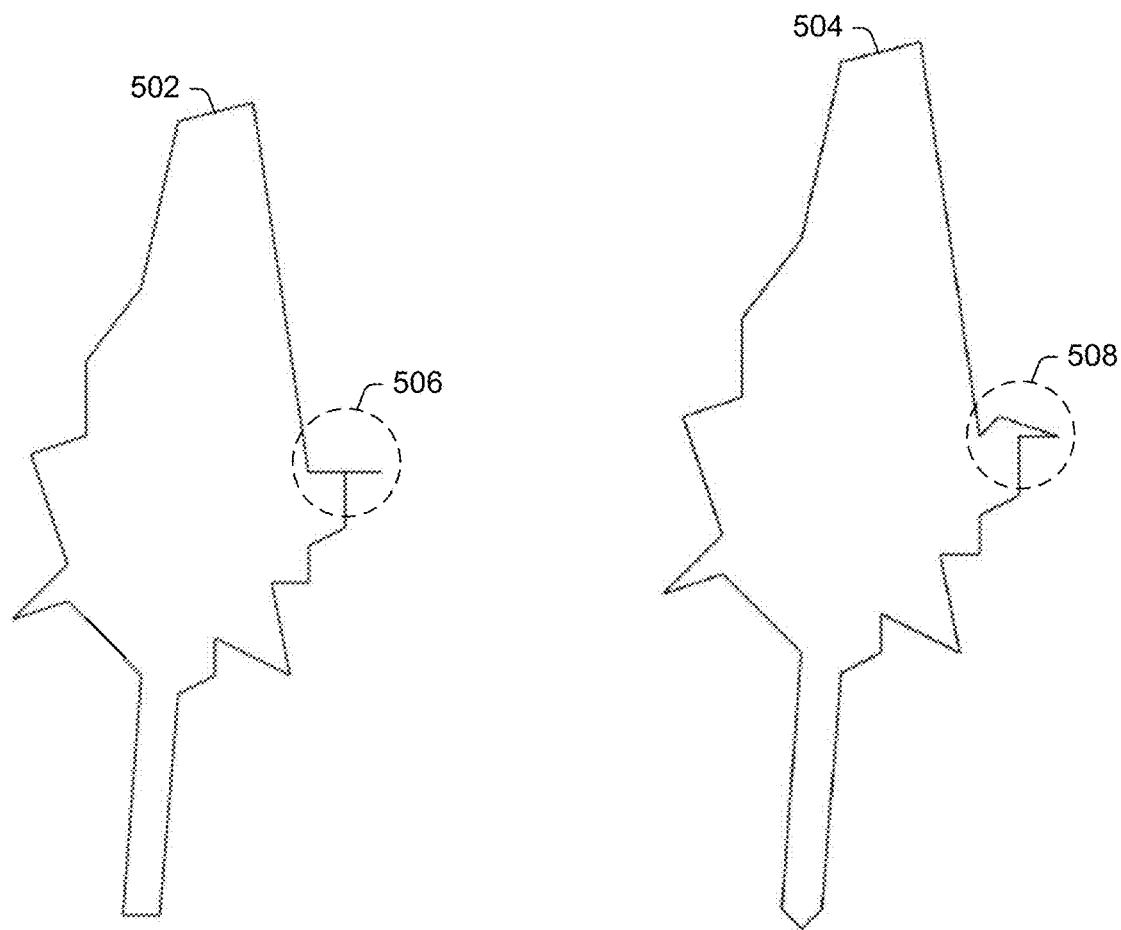
FIG. 5 illustrates example connected polylines in accordance with one or more aspects of the disclosure.

FIG. 5 illustrates an example of connected polylines 500 in accordance with one or more aspects of the disclosure. Connected polylines 500 include first connected polylines 502 and second connected polylines 504. Connected polylines 500 are examples of polylines generated by polyline module 250 in FIG. 1 and FIG. 2, and can be represented by one or more edge lists. Connected polylines 500 represent an outline of an image, such as a tree.

First connected polylines 502 includes a singularity condition, as indicated at region 506. Specifically, first connected polylines 502 include self-overlapping polylines in region 506. Self-overlapping include two or more polylines that are collinear along a line and overlap at least partially along the line. Such a singularity, if uncorrected, is a degenerate condition that can prevent a triangle mesh from being correctly generated by mesh generation module 252 or mesh deformation module 256. For instance, because the polylines are self-overlapping, a mesh may not be able to be generated that satisfies a minimum angle constraint (e.g., that the angles of each triangle be at least a certain angle, such as 20 degrees).

Accordingly, polyline module 250 is configured to automatically and without user intervention inflate one or more polylines responsive to detecting a singularity condition, such as self-overlapping polylines or polylines connected to form an angle below a minimum angle. In second connected polylines 504, at least some of the polylines have been inflated by expanding the polylines while keeping the polylines connected. As indicated in region 508, the self-overlapping polylines have been removed, and the singularity condition corrected. Therefore, a triangle mesh can be guaranteed to be generated using second connected polylines 504, since the singularity condition has been automatically detected and corrected.

Figure 6:
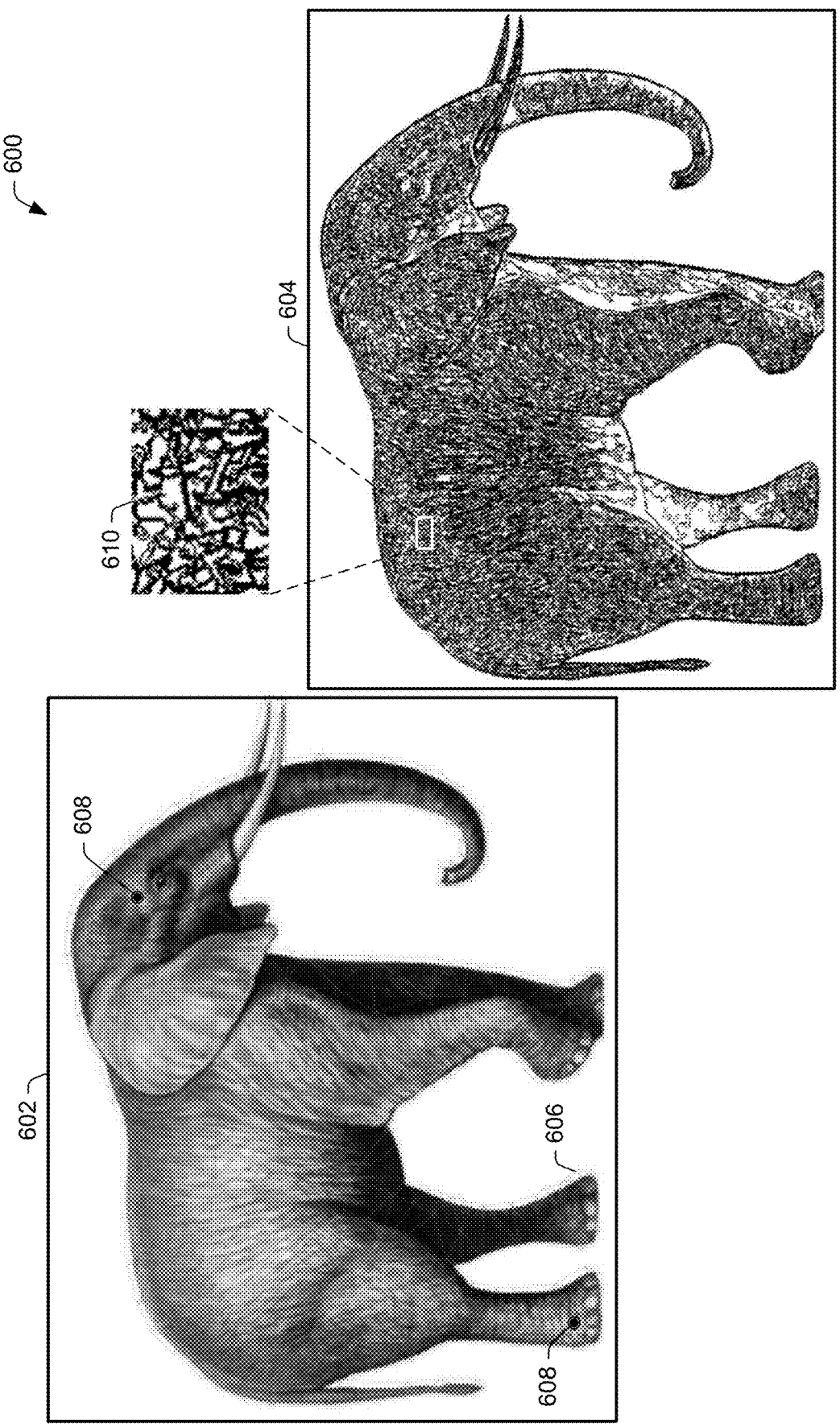
FIG. 6 illustrates example images in accordance with one or more aspects of the disclosure.

FIG. 6 illustrates example images 600 in accordance with one or more aspects of the disclosure. Images 600 includes image 602 and image 604. Image 602 includes an image of an elephant (e.g., an example of an image obtained by image retrieval module 244 in FIG. 1 and FIG. 2), overlaid with mesh 606 (e.g., an example of a mesh generated by mesh generation module 252 in FIG. 1 and FIG. 2). The image of the elephant in image 602 is generated from vector graphics including a plurality of curves (e.g., Bezier segments). Image 602 also includes handles 608 placed at vertices of mesh 606, operable to deform mesh 606 as discussed above. Image 602 can include any suitable number and type of control points. In the example in FIG. 6, image 602 is illustrated with two handles 608.

Image 604 illustrates the curves representing the elephant in image 602 (e.g., the vector graphics used to construct the image of the elephant in image 602). Image 604 includes over 140,000 Bezier segments, making it difficult to see the individual curves. Accordingly, region 610 illustrates a magnified portion of the Bezier segments of image 604. Because of the large number of Bezier curves in image 604 representing image 602, methods that directly sample the Bezier segments and generate a mesh from those samples are impractical in most workflows, since the number of triangles in such a mesh would require unreasonable computing resources. In contrast, mesh 606 generated according to the techniques described herein includes a small number of triangles (e.g., hundreds), and therefore requires relatively small amounts of computing resources.

Figure 7:
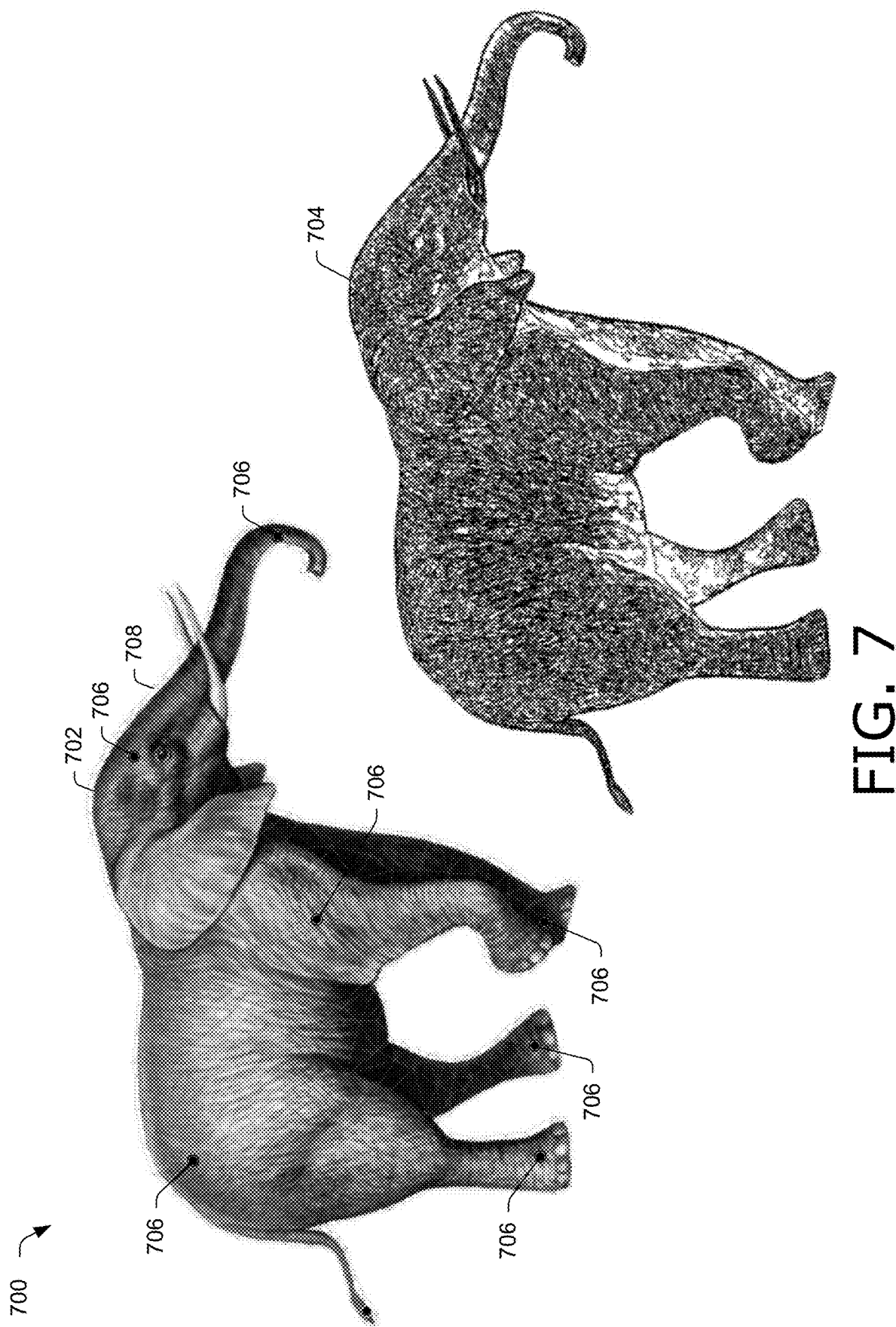
FIG. 7 illustrates example images in accordance with one or more aspects of the disclosure.

FIG. 7 illustrates example images 700 in accordance with one or more aspects of the disclosure. Images 700 includes image 702 and image 704, which correspond to images 602 and 604, respectively, responsive to a mesh being deformed (e.g., mesh 606 in FIG. 6). For instance, image 702 includes various handles 706 that can be selected and dragged to generate deformed mesh 708. Deformed mesh 708 is a deformed version of mesh 606 in FIG. 6, and is an example of a deformed mesh generated by mesh deformation module 256. By deforming a mesh into deformed mesh 708, image 702 of the elephant is moved along with the deformed mesh. For instance, a handle on the mesh overlaying the elephant's trunk has been lifted in FIG. 7 compared to FIG. 6, and the elephant's trunk has been raised according to deformed mesh 708.

Image 704 illustrates reconstructed curves (e.g., reconstructed Bezier segments) that have been reconstructed from deformed mesh 708 and barycentric coordinates of samples of the curves with respect to a respective triangle in mesh 708. These reconstructed curves are the vector graphics used to generate image 702 responsive to mesh 708 being deformed.

Figure 8:
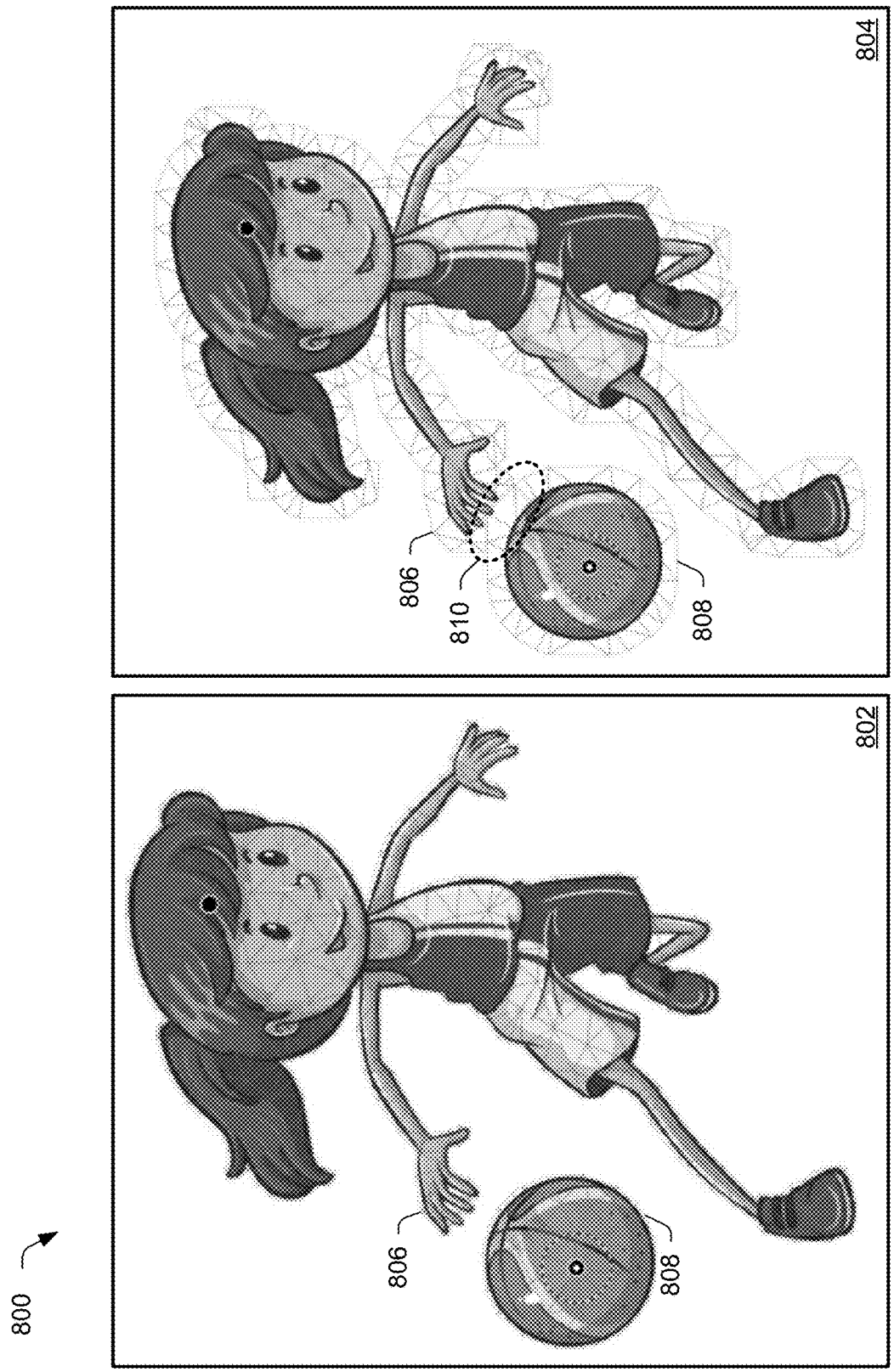
FIG. 8 illustrates example images in accordance with one or more aspects of the disclosure.

FIG. 8 illustrates example images 800 in accordance with one or more aspects of the disclosure. Images 800 includes image 802 and image 804. Each of image 802 and image 804 includes two objects, a girl and a basketball. In image 802, two separate meshes have been generated to cover the girl and the basketball, mesh 806 and mesh 808, respectively. Hence, the basketball can be moved (e.g., by distorting its mesh) independently from the girl, and vice versa. In one example, a user designates that the meshes for the basketball and the girl are to be maintained as separate meshes.

In image 804, mesh 806 for the girl has been merged with mesh 808 for the basketball in region 810 by inflating mesh 806 and mesh 808. Hence, mesh 806 and mesh 808 have been merged in image 804 into a single mesh. Accordingly, the basketball is connected to the girl by the merged mesh, and the girl and the basketball can no longer be moved independently. Instead, in image 804, the basketball and the girl can be moved together by distorting the merged mesh.

Figure 9:
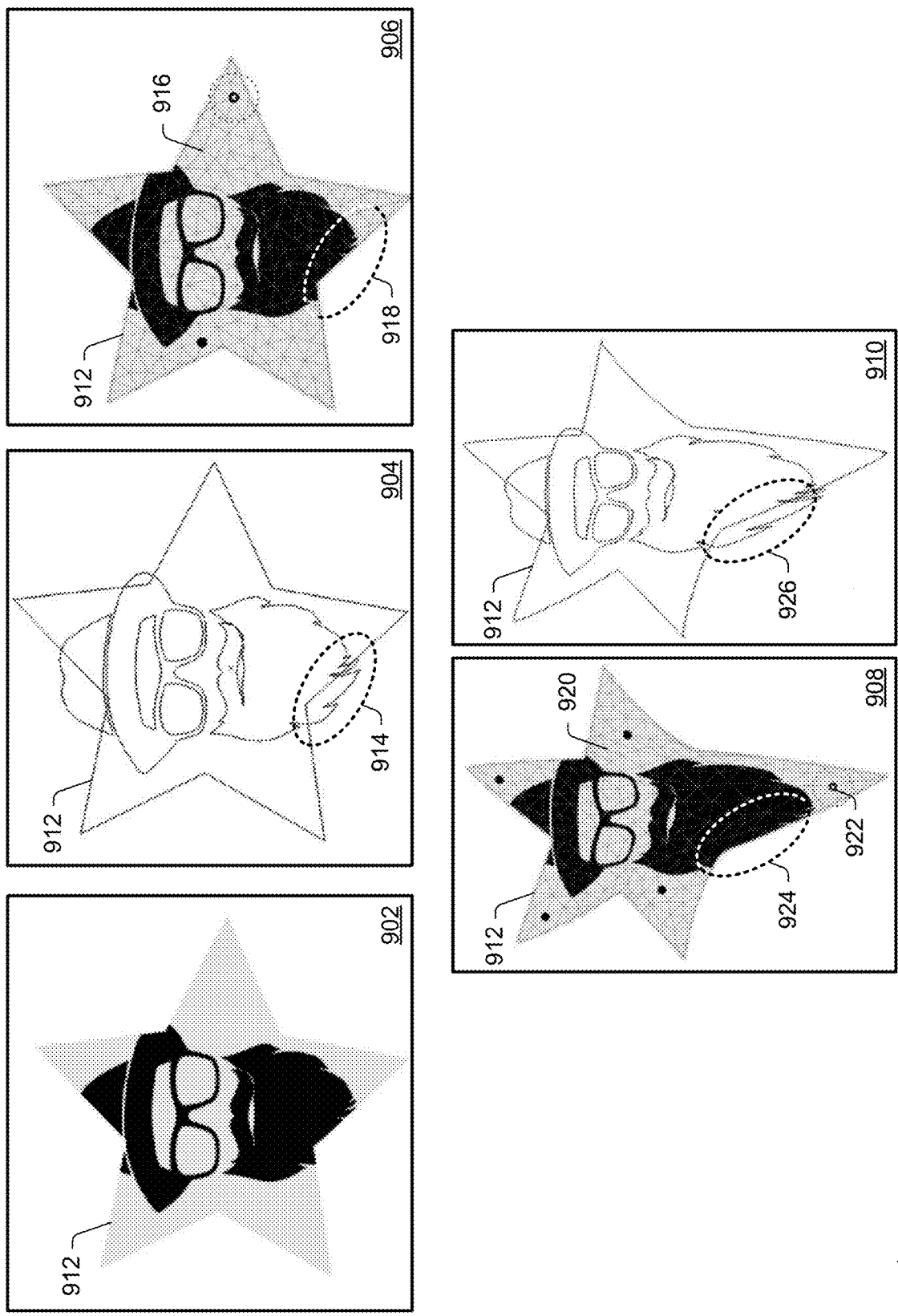
FIG. 9 illustrates example images in accordance with one or more aspects of the disclosure.

FIG. 9 illustrates example images 900 in accordance with one or more aspects of the disclosure. Images 900 illustrate a triangle mesh for an image that has been inserted into a clipping path, binding samples of curves outside the clipping path to triangles of the triangle mesh inside the clipping path, deforming the triangle mesh, and reconstructing the curves. Specifically, images 900 includes five images, image 902, image 904, image 906, image 908, and image 910. Each of these images includes a clipping path 912. In the example illustrated in FIG. 9, clipping path 912 forms the shape of a star, though clipping path 912 can be any suitable clipping path in which an image can be inserted, such as a box, a circle, an ellipse, a polygon, a crescent, a rhombus, a free-form bounding enclosure, and the like.

In image 902, an image of a man with a beard wearing a hat and glasses has been inserted into clipping path 912. Clipping path 912, however, obscures some of the image of the man. For instance, image 904 illustrates the outline of clipping path 912 and curves (e.g., Bezier segments) making up the image of the man. As seen in region 914, a part of the man's beard is obscured by clipping path 912 (e.g., region 914 includes a portion of the man's beard that is outside clipping path 912). Hence, the part of the man's beard in region 914 that is outside clipping path 912 is not exposed in image 902.

Image 906 illustrates clipping path 912 and the image of the man as illustrated in image 902, together with triangle mesh 916 that has been generated for the image of the man in accordance with clipping path 912. Triangle mesh 916 is an example of a mesh that can be generated by mesh generation module 252 in FIG. 2 and FIG. 3. As illustrated in image 906, triangle mesh 916 covers the image of the man inside clipping path 912, but does not cover parts of the image of the man that are obscured by clipping path 912. For instance, image 906 includes region 918, which corresponds to region 914 in image 904, that includes part of the image of the man that is obscured by clipping path 912 and that is not covered by triangle mesh 916.

However, as described above, samples of curves in region 918 that are not covered by triangle mesh 916 are bound to triangle mesh 916, such as by determining barycentric coordinates of samples of curves in region 918 not covered by triangle mesh 916 with respect to a respective nearest triangle of triangle mesh 916. Sample binding module 254 in FIG. 2 and FIG. 3 can bind samples of curves in region 918 that are not covered by triangle mesh 916 to a respective triangle in triangle mesh 916. Hence, by binding samples of curves in region 918 that are not covered by triangle mesh 916 to triangle mesh 916, these samples can be deformed together with the image that is enclosed by clipping path 912, such as when triangle mesh 916 is deformed by dragging a handle of triangle mesh 916.

For instance, image 908 illustrates a deformed version of image 906. Image 908 includes deformed mesh 920, which is a deformed version of triangle mesh 916. Deformed mesh 920 is an example of a deformed mesh generated by mesh deformation module 256 in FIG. 2 and FIG. 3. In the example in FIG. 9, deformed mesh 920 is formed by selecting and dragging handle 922 downward, to "stretch" a prong of the star represented by clipping path 912. Responsive to dragging handle 922, triangle mesh 916 is deformed into deformed mesh 920, and the image of the man is deformed according to deformed mesh 920. For instance, in region 924 in image 908, which corresponds to region 918, a visible portion of the man's beard has been deformed (e.g., stretched) together with deformed mesh 920. Though not visible in image 908 because of clipping path 912, region 924 also includes parts of the man's beard that have also been deformed according to deformed mesh 920, since region 924 includes samples of curves of the image of the man that are bound to triangle mesh 916.

For example, image 910 illustrates an outline of clipping path 912 after handle 922 has been moved, and reconstructed curves of the image of the man, such as generated by curve reconstruction module 258 in FIG. 2 and FIG. 3. Region 926 of image 910 corresponds to region 924 of image 908. In region 926, the reconstructed curves of the man's beard have been generated outside of clipping path 912, and because of the binding of samples of curves to triangle mesh 916, the reconstructed curves in region 926 are consistent with the reconstructed curves of the image of the man inside clipping path 912 (e.g., the reconstructed curves in region 926 are in proportion to reconstructed curves inside clipping path 912). Hence, the image of the man has been deformed as a whole, despite only part of the image of the man being covered by a mesh.

Having considered example images, consider now a discussion of example procedures for generating a triangle mesh for an image represented by curves in accordance with one or more aspects of the disclosure.

Example Procedures

Figure 10:
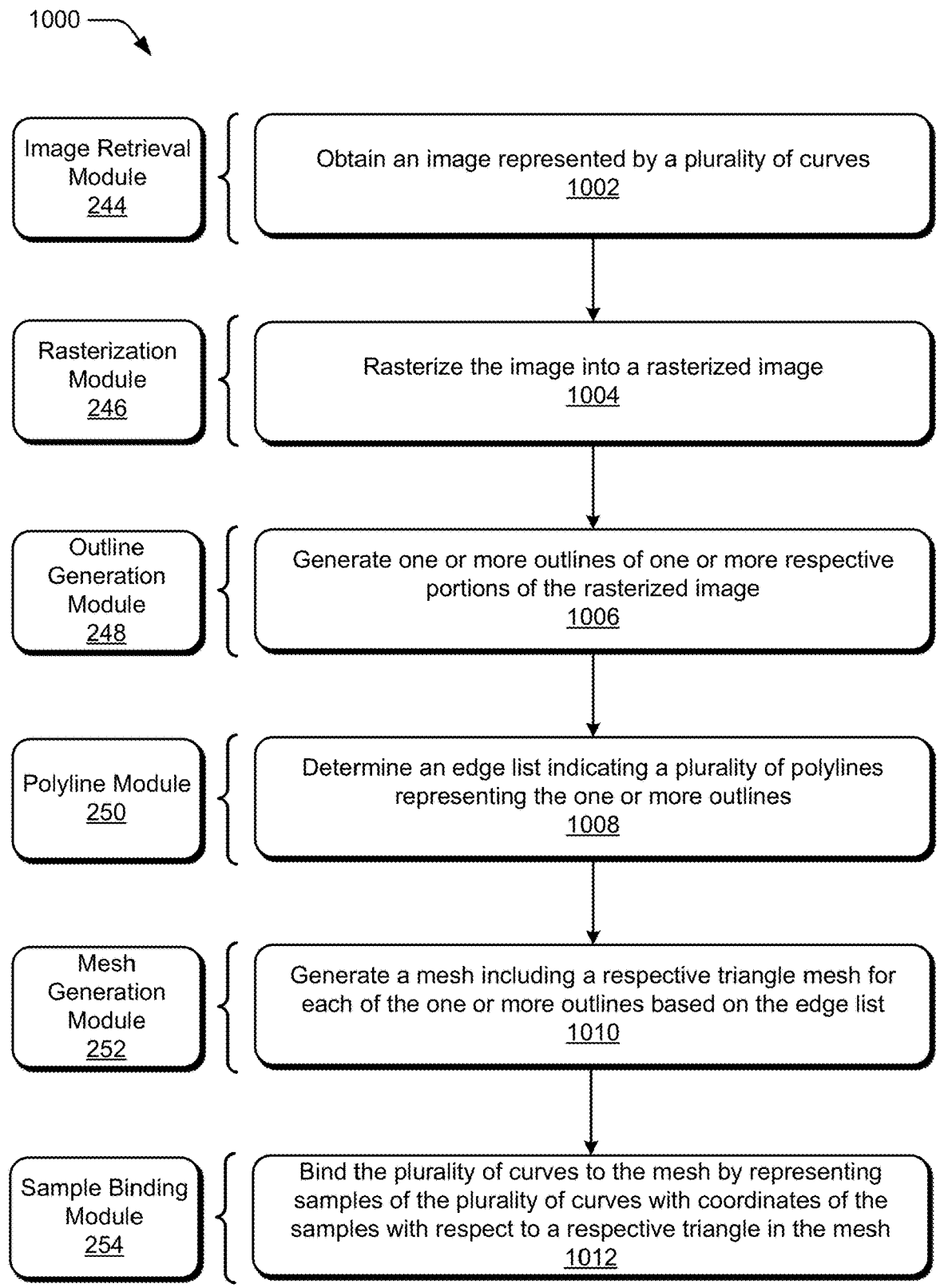
FIG. 10 illustrates a flow diagram depicting an example procedure in accordance with one or more aspects of the disclosure.

FIG. 10 illustrates an example procedure 1000 for generating a triangle mesh for an image represented by curves in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing devices 204 or server 214 of FIG. 2 that makes use of an image graphics system, such as system 300 or image graphics system 208. An image graphics system implementing procedure 1000 may be an independent application that has been installed on the computing device, a service hosted by a service provider that is accessible by the computing device, a plug-in module to the computing device, or combinations thereof.

An image represented by a plurality of curves is obtained (block 1002). In one example, image retrieval module 244 obtains an image represented by a plurality of curves.

The image is rasterized into a rasterized image (block 1004). In one example, rasterization module 246 rasterizes the image into a rasterized image.

One or more outlines of one or more respective portions of the rasterized image are generated (block 1006). In one example, outline generation module 248 generates one or more outlines of one or more respective portions of the rasterized image. Additionally or alternatively, generating one or more outlines includes inflating at least one of the one or more outlines by a user-defined amount, such as by a prescribed number of pixels (e.g., 3 pixels).

An edge list indicating a plurality of polylines representing the one or more outlines is determined (block 1008). In one example, polyline module 250 determines one or more outlines of one or more respective portions of the rasterized image. An edge list can include a list of vertices and indications of connections of the vertices to form the plurality of polylines. Additionally or alternatively, determining an edge list includes inflating at least one polyline automatically and without user intervention responsive to detecting overlapping polylines, such as self-overlapping polylines that are collinear and overlap along a line.

A mesh including a respective triangle mesh for each of the one or more outlines is generated based on the edge list (block 1010). In one example, mesh generation module 252 generates a mesh including a respective triangle mesh for each of the one or more outlines. Additionally or alternatively, generating a mesh can include constraining triangles of the mesh to have at least a minimum angle and to include no more than a maximum number of pixels of the rasterized image.

In one example, a mesh can include one or more control points, such as handles to deform the mesh and anchors to prevent movement of a point of the mesh. For instance, one or more handles can be added to a mesh, the handles operable to deform the mesh, and one or more anchors can be added to the mesh, the anchors operable to prevent deformation of the mesh.

Moreover, a number of triangles in the mesh can be independent from a number of a plurality of curves of an image, since the mesh is generated based on the edge list, rather than sampling the curves and generating triangles from the samples.

The plurality of curves are bound to the mesh by representing samples of the plurality of curves with coordinates of the samples with respect to a respective triangle in the mesh (block 1012). In one example, sample binding module 254 binds the plurality of curves to the mesh by representing samples of the plurality of curves with coordinates (e.g., barycentric coordinates) of the samples with respect to a respective triangle in the mesh.

In one example, binding a plurality of curves to the mesh includes generating a bounding volume hierarchy structure for triangles in the mesh using rectangles as bounding volumes for the triangles, and searching the bounding volume hierarchy structure to determine the respective triangle in the mesh.

Moreover, the samples of the plurality of curves can be determined by determining a plurality of segments of each curve of the plurality of curves, and assigning a number of the samples per segment based on a length of the segment.

Furthermore, a mesh can be deformed with one or more handles of the mesh into a deformed mesh, such as by selecting and moving a handle. At least some of the plurality of curves of the image can be reconstructed, including reconstructing curves responsive to deforming a mesh. Reconstructing curves of an image can include determining positions of the samples of the curves from locations of the respective triangle in the deformed mesh and the coordinates of the samples with respect to the respective triangle, and generating reconstructed curves from the positions of the samples.

In one example, a clipping path is obtained that separates the image into a first region interior to the clipping path that is overlapped by the mesh and a second region exterior to the clipping path that is not overlapped by the mesh. Binding samples of curves to a mesh can include representing samples of curves in the second region with coordinates of the samples in the second region with respect to triangles in the first region. In one example, the coordinates are barycentric coordinates.

Moreover, at least one triangle mesh of the mesh can be inflated according to a user-defined inflation parameter (e.g., a number of pixels), and, responsive to the inflating, at least two triangle meshes of the mesh can be joined into a single triangle mesh. Additionally or alternatively, at least two triangle meshes of the mesh can be joined into a single triangle mesh responsive to a user indication to join the two triangle meshes.

Figure 11:
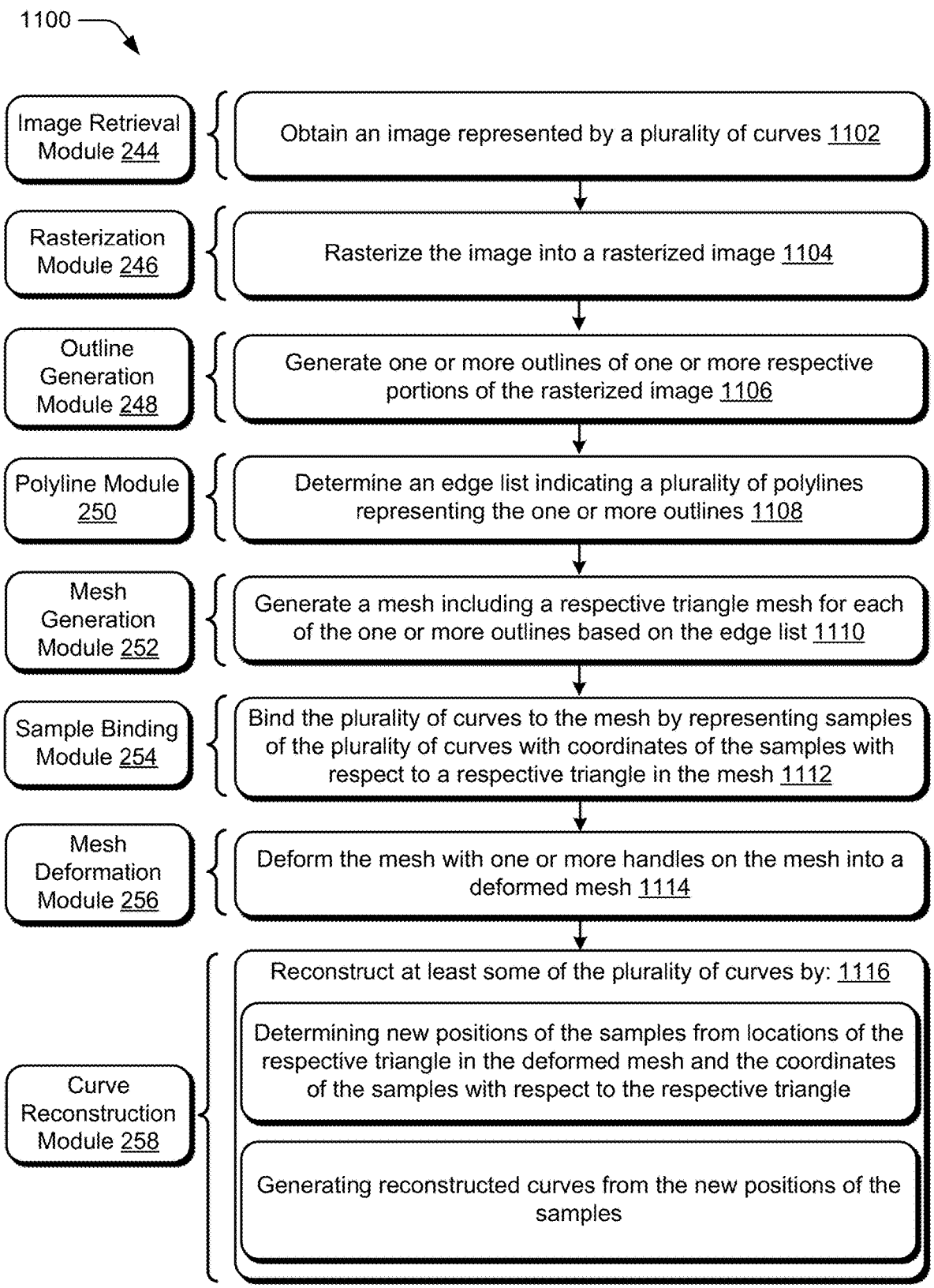
FIG. 11 illustrates a flow diagram depicting an example procedure in accordance with one or more aspects of the disclosure.

FIG. 11 illustrates an example procedure 1100 for generating a triangle mesh for an image represented by curves in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing devices 204 or server 214 of FIG. 2 that makes use of an image graphics system, such as system 300 or image graphics system 208. An image graphics system implementing procedure 1100 may be an independent application that has been installed on the computing device, a service hosted by a service provider that is accessible by the computing device, a plug-in module to the computing device, or combinations thereof.

An image represented by a plurality of curves is obtained (block 1102). In one example, image retrieval module 244 obtains an image represented by a plurality of curves.

The image is rasterized into a rasterized image (block 1104). In one example, rasterization module 246 rasterizes the image into a rasterized image. Additionally or alternatively, an image can be rasterized automatically and without user intervention responsive to the image being obtained.

One or more outlines of one or more respective portions of the rasterized image are generated (block 1106). In one example, outline generation module 248 generates one or more outlines of one or more respective portions of the rasterized image. Outline generation module 248 can be configured to receive user input indicating to maintain at least one outline as a separate outline from other outlines. Additionally or alternatively, one or more outlines of one or more respective portions of the rasterized image can be generated automatically and without user intervention responsive to the image being rasterized, such as by using a neural network to detect objects in the image and generating an outline for each detected object.

An edge list indicating a plurality of polylines representing the one or more outlines is determined (block 1108). In one example, polyline module 250 determines an edge list indicating a plurality of polylines representing the one or more outlines. Additionally or alternatively, an edge list indicating a plurality of polylines representing the one or more outlines can be determined automatically and without user intervention responsive to the one or more outlines being generated.

A mesh including a respective triangle mesh for each of the one or more outlines is generated based on the edge list (block 1110). In one example, mesh generation module 252 generates a mesh including a respective triangle mesh for each of the one or more outlines. Additionally or alternatively, a mesh can be generated automatically and without user intervention responsive to the edge list being generated.

The plurality of curves are bound to the mesh by representing samples of the plurality of curves with coordinates of the samples with respect to a respective triangle in the mesh (block 1112). In one example, sample binding module 254 binds the plurality of curves are bound to the mesh by representing samples of the plurality of curves with coordinates of the samples with respect to a respective triangle in the mesh. Additionally or alternatively, curves can be bound to the mesh generated automatically and without user intervention responsive to the mesh being generated.

In one example, the image is separated into a first region interior to a clipping path that is overlapped by the mesh and a second region exterior to the clipping path that is not overlapped by the mesh. At least some samples of curves in the second region are bound with barycentric coordinates of the at least some samples with respect to closest respective triangles in the first region to the at least some samples. Hence, at least one of the barycentric coordinates can be greater than unity or less than zero (e.g., negative).

Furthermore, the samples of the plurality of curves can be represented as data tuples, such as tuples including an index of the respective triangle mesh, an index of the respective triangle in the mesh, and the coordinates.

The mesh is deformed with one or more handles on the mesh into a deformed mesh (block 1114). In one example, mesh deformation module 256 deforms the mesh into a deformed mesh with one or more handles on the mesh. The mesh can be deformed based on a user input, such as a user selecting and dragging a handle. Furthermore, the mesh can be deformed based on applying a transformation (e.g., a skinning transformation) to the mesh. Additionally or alternatively, the mesh can be deformed automatically and without user intervention responsive to the curves being bound to the mesh, such as by automatically applying a workflow to the mesh that includes predefined transformations to the mesh.

At least some of the plurality of curves are reconstructed by determining new positions of the samples from locations of the respective triangle in the deformed mesh and the coordinates of the samples with respect to the respective triangle and generating reconstructed curves from the new positions of the samples (block 1116). In one example, curve reconstruction module 258 reconstructs at least some of the plurality of curves by determining new positions of the samples from locations of the respective triangle in the deformed mesh and the coordinates of the samples with respect to the respective triangle and generating reconstructed curves from the new positions of the samples. Generating the reconstructed curves can include determining basis points of Bezier splines from the new positions of the samples. Additionally or alternatively, curves can be reconstructed automatically and without user intervention responsive to the mesh being deformed.

Figure 12:
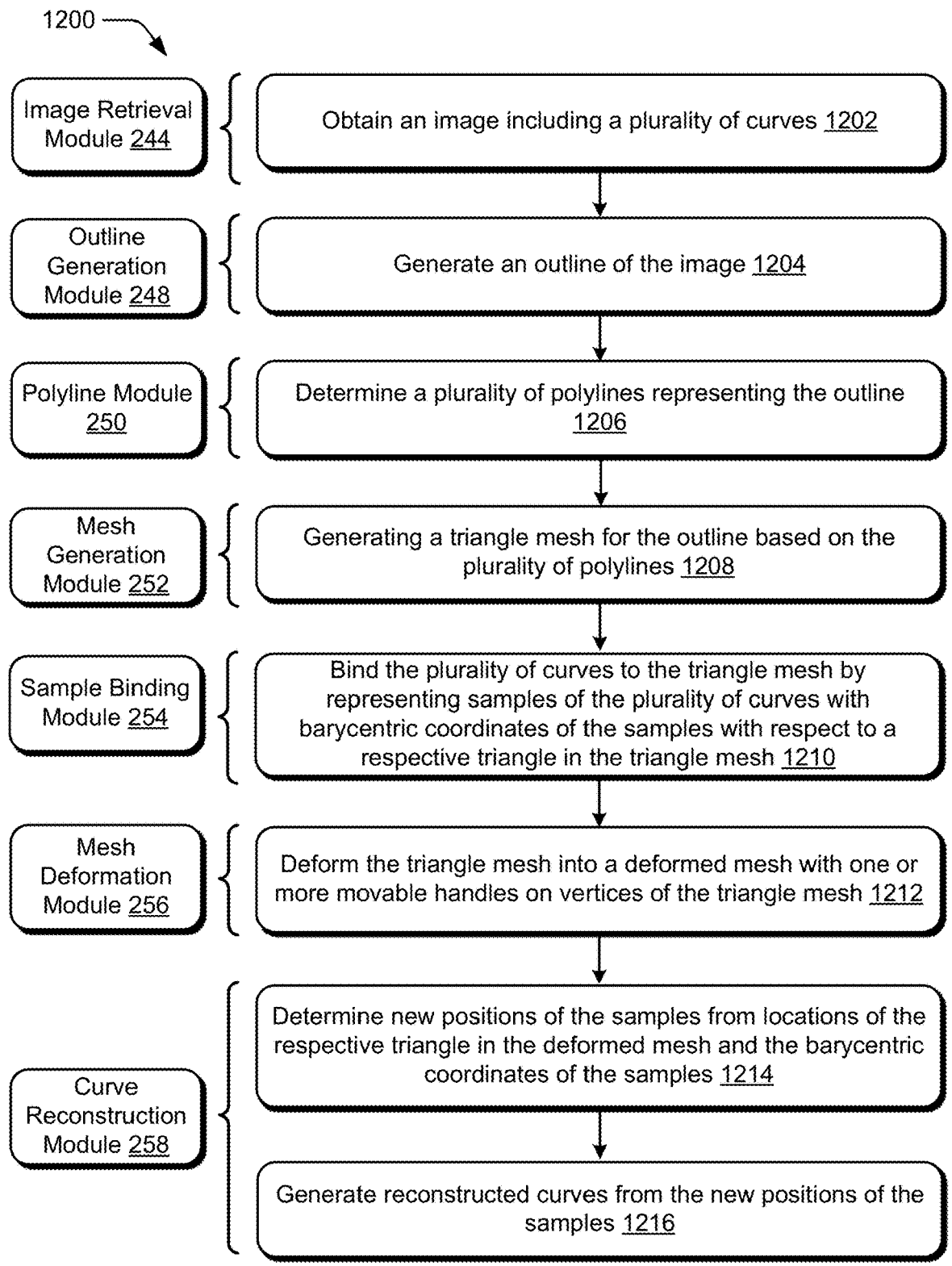
FIG. 12 illustrates a flow diagram depicting an example procedure in accordance with one or more aspects of the disclosure.

FIG. 12 illustrates an example procedure 1200 for generating a triangle mesh for an image represented by curves in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing devices 204 or server 214 of FIG. 2 that makes use of an image graphics system, such as system 300 or image graphics system 208. An image graphics system implementing procedure 1200 may be an independent application that has been installed on the computing device, a service hosted by a service provider that is accessible by the computing device, a plug-in module to the computing device, or combinations thereof.

An image including a plurality of curves is obtained (block 1202). In one example, image retrieval module 244 obtains an image including a plurality of curves.

An outline of the image is generated (block 1204). In one example, outline generation module 248 generates an outline of the image, such as from an image represented by curves. Additionally or alternatively, the image can be rasterized into a rasterized image, and the outline of the image can be generated from the rasterized image. A rasterized image can be grayscale with transparency (e.g., transparency can be represented as a percentage of a transparency parameter).

A plurality of polylines representing the outline are determined (block 1206). In one example, polyline module 250 determines a plurality of polylines representing the outline, such as by applying an RDP algorithm to the outline, as described above.

A triangle mesh for the outline is generated based on the plurality of polylines (block 1208). In one example, mesh generation module 252 generates a triangle mesh for the outline.

The plurality of curves are bound to the triangle mesh by representing samples of the plurality of curves with barycentric coordinates of the samples with respect to a respective triangle in the triangle mesh (block 1210). In one example, sample binding module 254 binds the plurality of curves to the triangle mesh by representing samples of the plurality of curves with barycentric coordinates of the samples with respect to a respective triangle in the triangle mesh.

The triangle mesh is deformed into a deformed mesh with one or more movable handles on vertices of the triangle mesh (block 1212). In one example, mesh deformation module 256 deforms the triangle mesh into a deformed mesh with one or more movable handles on vertices of the triangle mesh.

New positions of the samples are determined from locations of the respective triangle in the deformed mesh and the barycentric coordinates of the samples (block 1214). In one example, curve reconstruction module 258 determines new positions of the samples from locations of the respective triangle in the deformed mesh and the barycentric coordinates of the samples.

Reconstructed curves are generated from the new positions of the samples (block 1216). In one example, curve reconstruction module 258 generates reconstructed curves from the new positions of the samples.

The procedures described herein constitute an improvement over procedures that generate a mesh from a convex hull of a polygon encompassing an image, and procedures that generate a mesh by sampling curves of an image and using the sample points as vertices of triangles in a mesh. By generating an outline of an image from a rasterized version of the image, reducing the outline to a set of connected polylines, and generating a triangle mesh according to the connected polylines, a triangle mesh is generated that accurately represents the image (e.g., it covers the image where pixels of the image are exposed), and the complexity of the triangle mesh is decoupled from the complexity of the input curves. Hence, the procedures described herein efficiently and robustly generate a triangle mesh for images with large numbers of curves (e.g., hundreds of thousands of curves) where procedures that directly sample the input curves and use the samples as triangle vertices fail or require a prohibitive amount of resources and delay to generate a mesh. Furthermore, by detecting a singularity condition (e.g., self-overlapping polylines) and correcting for the singularity condition, such as by automatically inflating one or more self-overlapping polylines, the procedures described herein guarantee that a triangle mesh can be generated (e.g., triangle constraints can be satisfied). Moreover, by binding samples of curves not covered by a mesh, such as curves that are obscured by a clipping path, to the mesh, the procedures described herein supports workflows that use clipping paths by generating deformed meshes and reconstructed images based on an entire image, not just those parts of an image exposed and covered by a mesh. Hence, an image obscured by a clipping path is more naturally deformed by the procedures described herein than by other procedures.

Having considered example procedures in accordance with one or more implementations, consider now example systems and devices that can be utilized to practice the inventive principles described herein.

Example Systems and Devices

FIG. 13 illustrates an example system generally at 1300 that includes an example computing device 1302 that is representative of one or more computing systems and devices that may implement the various techniques described herein. This is illustrated through inclusion of image graphics system 208, system 300, image graphics application 242, and graphics support system 216, which operate as described above. Computing device 1302 may be, for example, a user computing device (e.g., one of computing devices 204), or a server device of a service provider, (e.g., server 214). Furthermore, computing device 1302 may include an on-chip system, multiple computing devices, combinations thereof, or any other suitable computing device or computing system. Accordingly, FIG. 13 illustrates computing device 1302 as one or more of a tablet, a laptop computer, a smart phone, smart eye glasses, and a camera, though these examples are illustrative and in no way are meant to limit the type or number of devices included in computing device 1302.

The example computing device 1302 includes a processing system 1304, one or more computer-readable media 1306, and one or more I/O interfaces 1308 that are communicatively coupled to each other. Although not shown, computing device 1302 may further include a system bus or other data and command transfer system that couples the various components, one to another. A system bus can include any one or combination of different bus structures, such as a memory bus or memory controller, a peripheral bus, a universal serial bus, and a processor or local bus that utilizes any of a variety of bus architectures. A variety of other examples are also contemplated, such as control and data lines.

Processing system 1304 is representative of functionality to perform one or more operations using hardware. Accordingly, processing system 1304 is illustrated as including hardware elements 1310 that may be configured as processors, functional blocks, and so forth. This may include implementation in hardware as an application specific integrated circuit or other logic device formed using one or more semiconductors. Hardware elements 1310 are not limited by the materials from which they are formed or the processing mechanisms employed therein. For example, processors may be comprised of semiconductor(s) and transistors (e.g., electronic integrated circuits (ICs)). In such a context, processor-executable instructions may be electronically-executable instructions. Processors 222 in FIG. 2 are an example of processing system 1304.

Computer-readable storage media 1306 is illustrated as including memory/storage 1312. Storage 224 in FIG. 2 is an example of memory/storage included in memory/storage 1312. Memory/storage component 1312 may include volatile media (such as random access memory (RAM)), non-volatile media (such as read only memory (ROM), Flash memory, optical disks, magnetic disks, and so forth), or combinations thereof. Memory/storage component 1312 may include fixed media (e.g., RAM, ROM, a fixed hard drive, and so on) as well as removable media (e.g., Flash memory, a removable hard drive, an optical disc, and so forth). Computer-readable media 1306 may be configured in a variety of other ways as further described below.

Input/output interface(s) 1308 are representative of functionality to allow a user to enter commands and information to computing device 1302, and also allow information to be presented to the user and other components or devices using various input/output devices. Examples of input devices include a keyboard, a cursor control device (e.g., a mouse), a microphone, an array of microphones, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, computing device 1302 may be configured in a variety of ways as further described below to support user interaction.

Computing device 1302 also includes applications 1314. Applications 1314 are representative of any suitable applications capable of running on computing device 1302, and may include a web browser which is operable to access various kinds of web-based resources (e.g., assets, media clips, images, content, configuration files, services, user profiles, and the like). Applications 1314 include image graphics application 242, as previously described. Furthermore, applications 1414 includes any applications supporting image graphics system 208, system 300, and graphics support system 216.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by computing device 1302. By way of example, and not limitation, computer-readable media may include "computer-readable storage media" and "computer-readable signal media."

"Computer-readable storage media" refers to media, devices, or combinations thereof that enable persistent or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media, storage devices, or combinations thereof implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 1302, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1310 and computer-readable media 1306 are representative of modules, programmable device logic, fixed device logic implemented in a hardware form, or combinations thereof that may be employed in some aspects to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions, logic embodied by the hardware, or combinations thereof, as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions, logic embodied on some form of computer-readable storage media or by one or more hardware elements 1310, or combinations thereof. Computing device 1302 may be configured to implement particular instructions and functions corresponding to the software and hardware modules. Accordingly, implementation of a module that is executable by computing device 1302 as software may be achieved at least partially in hardware, e.g., through use of computer-readable storage media and hardware elements 1310 of processing system 1304. The instructions and functions may be executable/operable by one or more articles of manufacture (for example, one or more computing devices 1302 or processing systems 1304) to implement techniques, modules, and examples described herein.

The techniques described herein may be supported by various configurations of computing device 1302 and are not limited to the specific examples of the techniques described herein. This functionality may also be implemented all or in part through use of a distributed system, such as over a "cloud" 1316 via a platform 1318 as described below.

Cloud 1316 includes and is representative of a platform 1318 for resources 1320. Platform 1318 abstracts underlying functionality of hardware (e.g., servers) and software resources of cloud 1316. Resources 1320 may include applications, data, or applications and data that can be utilized while computer processing is executed on servers that are remote from computing device 1302. Resources 1320 can also include services provided over the Internet, through a subscriber network, such as a cellular or Wi-Fi network, or combinations thereof. Resources 1320 can include asset store 1122, which stores assets, such as images, photographs (e.g., user images in a gallery, a database of stock photographs, and the like), document templates, user profile data, user image libraries, photographs posted in a shared photo service, metadata of assets, and the like, and may be accessed by computing device 1302.

Platform 1318 may abstract resources and functions to connect computing device 1302 with other computing devices. Platform 1318 may also serve to abstract scaling of resources to provide a corresponding level of scale to encountered demand for resources 1320 that are implemented via platform 1318. Accordingly, in an interconnected device embodiment, implementation of functionality described herein may be distributed throughout system 1300. For example, the functionality may be implemented in part on computing device 1302 as well as via platform 1318 that abstracts the functionality of cloud 1316.

CONCLUSION

In one or more implementations, a digital medium environment includes at least one computing device. Systems and techniques are described herein for generating a triangle mesh for an image represented by curves (e.g., Bezier segments). An outline of an image is determined and reduced to a set of connected polylines that are efficiently represented in an edge list. A triangle mesh is generated based on the edge list, rather than by directly sampling the curves of the image and using the samples as vertices of triangles. Thus, the triangle mesh is generated with a density (e.g., number of triangles) independent from a number of curves representing the image. Samples of the curves are bound to the triangle mesh by representing the samples with barycentric coordinates with respect to a triangle in the mesh. Hence, once a mesh is deformed, locations of the samples are determined from the barycentric coordinates and triangles in the deformed mesh, and used to reconstruct the curves of the deformed image.

Although the invention has been described in language specific to structural features and methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to generate image graphics, a method implemented by a computing device, the method comprising:
    rasterizing an image represented by curves into a rasterized image;
    determining an edge list that represents an outline of an object of the rasterized image as a set of connected polylines that includes self-overlapping polylines;
    generating a corrected set of polylines by inflating at least one of the connected polylines, the corrected set of polylines having no self-overlapping polylines;
    generating a mesh of polygons for a region of the image enclosed by the corrected set of polylines; and
    representing samples of the curves that are inside a respective one of the polygons as linear combinations of vertices of the respective one of the polygons.

2. The method as described in claim 1, further comprising:
    assigning at least one handle to at least one vertex of a polygon of the mesh;
    deforming the mesh with the at least one handle into a deformed mesh; and
    reconstructing, responsive to the deforming, at least some of the curves by:
        determining positions of the samples from the linear combinations of vertices and locations of the respective one of the polygons in the deformed mesh; and
        generating reconstructed curves from the positions of the samples.

3. The method as described in claim 2, wherein the deforming the mesh includes at least one of applying a skinning transformation to the mesh, applying to the mesh a workflow that uses diffusion curves, or applying to the mesh an additional workflow that uses vector fields.

4. The method as described in claim 2, wherein the deforming the mesh includes:
    assigning weights to vertices of the polygons of the mesh based on a distribution of the mesh over the region of the image;
    determining new weights for the vertices of the polygons in the deformed mesh as combinations of the weights of the vertices of the polygons of the mesh; and
    determining new positions of the vertices of the polygons in the deformed mesh based on the new weights.

5. The method as described in claim 2, wherein the deforming the mesh includes constraining the polygons of the deformed mesh according to at least one of having a minimum angle, including no more than a maximum number of pixels of the rasterized image, or including a least a minimum number of pixels of the rasterized image.

6. The method as described in claim 1, wherein the polygons include triangles.

7. The method as described in claim 1, wherein the linear combinations of vertices include weights of the vertices that sum to unity.

8. The method as described in claim 1, wherein the representing the samples of the curves includes generating a respective data tuple for each one of the samples, the respective data tuple including an index of the mesh, an index of the respective one of the polygons, and weights of the vertices in the linear combinations.

9. The method as described in claim 8, wherein the respective data tuple includes some but not all of the weights of the vertices used in the linear combinations.

10. The method as described in claim 1, wherein the rasterizing includes:
   determining a spectral content of the image; and
   selecting a resolution of the rasterized image based on the spectral content.

11. An image graphics system implemented by a computing device in a digital medium environment, the image graphics system including modules implemented at least partially in hardware of the computing device, the image graphics system comprising:
   a rasterization module implemented to rasterize an image represented by curves into a rasterized image;
   a polyline module implemented to:
      determine an edge list that represents an outline of an object of the rasterized image as a set of connected polylines that includes self-overlapping polylines; and
      generate a corrected set of polylines by inflating at least one of the connected polylines, the corrected set of polylines having no self-overlapping polylines; and
   a mesh generation module to generate a mesh of polygons for a region of the image enclosed by the corrected set of polylines; and
   a sample binding module to represent samples of the curves that are inside a respective one of the polygons as linear combinations of vertices of the respective one of the polygons.

12. The image graphics system as described in claim 11, further comprising:
   a mesh deformation module implemented to deform the mesh with one or more handles on the mesh into a deformed mesh; and
   a curve reconstruction module implemented to reconstruct at least some of the curves including to:
      determine positions of the samples from the linear combinations of vertices and locations of the respective one of the polygons in the deformed mesh; and
      generate reconstructed curves from the positions of the samples.

13. The image graphics system as described in claim 11, wherein the mesh generation module is implemented to generate the mesh so that a density of the polygons in the mesh is decoupled from a density of the curves of the image.

14. The image graphics system as described in claim 11, wherein the mesh generation module is implemented to generate the mesh from the edge list and not the samples of the curves.

15. The image graphics system as described in claim 11, wherein the rasterization module is implemented to:
   determine a number of the curves of the image; and
   select a resolution of the rasterized image based on the number of the curves.

16. The image graphics system as described in claim 11, wherein the polyline module is implemented to reduce the outline to the set of connected polylines using an iterative end-point fit algorithm that receives a curve approximated by a series of points and identifies a similar curve having fewer points than the series of points.

17. The image graphics system as described in claim 11, wherein the sample binding module is implemented to represent the samples of the curves as the linear combinations of vertices automatically and without user intervention responsive to the mesh generation module generating the mesh.

18. In a digital medium environment to generate image graphics, one or more computer-readable storage media comprising instructions stored thereon that, responsive to execution by a computing device, causes the computing device to perform operations including:
   determining an edge list that represents an outline of an object in an image represented by curves as a set of connected polylines that includes self-overlapping polylines;
   generating a corrected set of polylines by inflating at least one of the connected polylines, the corrected set of polylines having no self-overlapping polylines;
   generating a mesh of polygons for a region of the image enclosed by the corrected set of polylines;
   generating samples of the curves; and
   binding the curves to the mesh by representing the samples that are inside a respective one of the polygons as linear combinations of vertices of the respective one of the polygons.

19. The one or more computer-readable storage media as described in claim 18, the operations further including:
   determining additional samples of the samples that are not covered by the mesh;
   determining a nearest polygon of the mesh to the additional samples; and
   representing the additional samples as linear combinations of vertices of the nearest polygon.

20. The one or more computer-readable storage media as described in claim 18, wherein the linear combinations of vertices include weights of the vertices that sum to unity.

* * * * *